US012580732B2

(12) United States Patent
Naito

(10) Patent No.: US 12,580,732 B2
(45) Date of Patent: Mar. 17, 2026

(54) ENCRYPTION DEVICE, DECRYPTION DEVICE, ENCRYPTION METHOD, DECRYPTION METHOD, AND COMPUTER READABLE MEDIUM

(71) Applicant: Mitsubishi Electric Corporation, Tokyo (JP)

(72) Inventor: Yusuke Naito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 293 days.

(21) Appl. No.: 18/231,626

(22) Filed: Aug. 8, 2023

(65) Prior Publication Data

US 2023/0388103 A1     Nov. 30, 2023

Related U.S. Application Data

(63) Continuation of application No. PCT/JP2021/015013, filed on Apr. 9, 2021.

(51) Int. Cl.
*H04L 9/06* (2006.01)
*H04L 9/32* (2006.01)

(52) U.S. Cl.
CPC ............. *H04L 9/0618* (2013.01); *H04L 9/32* (2013.01)

(58) Field of Classification Search
CPC ................................. H04L 9/0618; H04L 9/32
See application file for complete search history.

(56) References Cited

U.S. PATENT DOCUMENTS 10,587,406 B1 * 3/2020 Levin .................... H04L 9/0869
11,438,137 B2   9/2022 Naito et al.
(Continued)

FOREIGN PATENT DOCUMENTS

JP        2006-39206 A    2/2006
WO   WO 2007/052477 A1   5/2007
(Continued)

OTHER PUBLICATIONS

Banik et al., "Gift: A Small Present—Towards Reaching the Limit of Lightweight Encryption", CHES 2017, Lecture Notes in Computer Science, vol. 10529, pp. 321-345.
(Continued)

*Primary Examiner* — Jeffrey C Pwu
*Assistant Examiner* — Paul J Skwierawski
(74) *Attorney, Agent, or Firm* — BIRCH, STEWART, KOLASCH & BIRCH, LLP

(57) ABSTRACT

An encryption device divides a plaintext M to generate a value M[1], . . . , and a value M[m]. The encryption device generates an n-bit value B[i] by encrypting a value B[i−1] by a block cipher with a value T[i−1] as a key, for each integer i of i=1, . . . , m in ascending order, generates a value C[i] from the value B[i] and a value M[i], and generates an n-bit value T[i] from a value P(T[i−1]) obtained by converting the value T[i−1] using a replacement function P, a value F(B[i]) obtained by converting the value B[i] using a replacement function F, and the value C[i]. The encryption device generates a ciphertext C by connecting the values C[i] for i=1, . . . , m. The encryption device generates from a value H[m] and the value B[m], an authenticator Tag for detecting an alteration of the ciphertext C.

18 Claims, 22 Drawing Sheets

(56) References Cited

U.S. PATENT DOCUMENTS

| | | |
|---|---|---|
| 2006/0026442 A1 | 2/2006 | Ittogi |
| 2009/0138710 A1 | 5/2009 | Minematsu |
| 2010/0246809 A1 | 9/2010 | Noda et al. |
| 2016/0173276 A1 | 6/2016 | Minematsu |
| 2018/0242138 A1 | 8/2018 | Chen et al. |
| 2020/0186328 A1* | 6/2020 | Naito .................... H04L 9/0618 |
| 2021/0399875 A1* | 12/2021 | Inoue .................... H04L 9/3242 |

FOREIGN PATENT DOCUMENTS

| | | | |
|---|---|---|---|
| WO | WO 2007/105709 A1 | 9/2007 | |
| WO | WO 2015/015702 A1 | 2/2015 | |
| WO | WO 2017/031639 A1 | 3/2017 | |
| WO | WO-2019043921 A1 * | 3/2019 | ........... H04L 9/0637 |

OTHER PUBLICATIONS

International Search Report for PCT/JP2021/015013 mailed on Jul. 13, 2021.
Iwata et al., "Breaking and Repairing GCM Security Proofs", CRYPTO 2012, Proceedings, Lecture Notes in Computer Science, Springer 2012, vol. 7417, pp. 31-49.
Iwata et al., "Duel of the Titans: The Romulus and Remus Families of Lightweight AEAD Algorithms", ToSC 2020, vol. 2020, No. 1, pp. 43-120.
National Institute of Standards and Technology (NIST), Announcing the "Advanced Encryption Standard (AES)", Federal Information Processing Standards Publication 197, Nov. 26, 2001, total 51 pages.

\* cited by examiner

START

S261
$T^+[0] = Et,$
$B^+[0] = Eb$

S262
$B^+[1] = E(T^+[0], B^+[0])$

S263
$T^+[1] = P(T^+[0])$
$\oplus F(B^+[1])$

S264
$Tag' = T^+[1]$

S265
WHEN Tag = Tag', OUTPUT PLAINTEXT
WHEN Tag ≠ Tag', OUTPUT reject

END

ENCRYPTION DEVICE, DECRYPTION DEVICE, ENCRYPTION METHOD, DECRYPTION METHOD, AND COMPUTER READABLE MEDIUM

CROSS REFERENCE TO RELATED APPLICATION

This application is a Continuation of PCT International Application No. PCT/JP2021/015013, filed on Apr. 9, 2021, which is hereby expressly incorporated by reference into the present application.

TECHNICAL FIELD

The present disclosure relates to authenticated encryption using a block cipher.

BACKGROUND ART

An authenticated encryption algorithm is an encryption algorithm that has both of a confidentiality function and a tamper detection function at the same time. It is possible for two parties to communicate with each other using the authenticated encryption algorithm while a plaintext is kept confidential, and it is possible for a receiver to check whether or not a message transmitted through a communication path has been tampered with.

The authenticated encryption algorithm includes two algorithms, which are an encryption function Enc and a decryption function Dec.

The encryption function Enc is a function that takes as input, a secret key K, a nonce N, public data A, and a plaintext M, and outputs a ciphertext C and an authenticator Tag for tamper detection. A different value is used for the nonce N for each encryption, and the same value is not used unless the secret key K is changed.

The decryption function Dec is a function that takes as input, the secret key K, the nonce N, the public data A, the ciphertext C, and the authenticator Tag for tamper detection, and outputs the plaintext M when an input value has not been tampered with or outputs a value indicating that the input value has been falsified when the input value has been tampered with. The value indicating that the input value has been falsified is hereinafter referred to as reject.

It is assumed that a transmitter Alice and a receiver Bob communicates with each other using the authenticated encryption algorithm. Alice and Bob share the secret key K in advance.

By computing the encryption function Enc using the secret key K, the nonce N, the public data A, and the plaintext M, as input, the transmitter Alice generates the ciphertext C and the authenticator Tag for tamper detection. The transmitter Alice transmits to the receiver Bob, the nonce N, the public data A, the ciphertext C, and the authenticator Tag for tamper detection.

By computing the decryption function Dec using the secret key K, the nonce N, the public data A, the ciphertext C, and the authenticator Tag for tamper detection, as input, the receiver Bob determines whether or not tempering has not been detected, and generates the plaintext M when the input has not been tampered with.

The public data A is a value that may be released to the public. Further, the transmitter Alice sets the nonce N to a different value for each encryption and does not use the same value.

Security of the authenticated encryption algorithm includes confidentiality and integrity. Definitions of the confidentiality and the integrity are described in Non-Patent Literature 1.

The confidentiality is security that defines that a plaintext cannot be leaked from a ciphertext. In a security game of the confidentiality, an attacker accesses either the encryption function Enc of the authenticated encryption algorithm or an oracle that outputs a random number, and identifies which is being accessed. A probability of the identification by the attacker is called an identification probability. The lower the identification probability is, the higher the security of the confidentiality is.

The integrity is security that defines that public data or a ciphertext cannot be tampered with. In a security game of the integrity, an attacker accesses the encryption function Enc and the decryption function Dec of the authenticated encryption algorithm, inputs the public data, the ciphertext, and an authenticator falsified to the decryption function Dec, and aims to pass a tamper check. A probability of passing the tamper check is called a tamper probability. The lower the tamper probability is, the higher the security of the integrity is.

As a method of configuring the authenticated encryption algorithm, there is a method using a block cipher.

The block cipher is configured with the encryption function E and the decryption function D. The encryption function E is a function that takes as input, a k-bit key K and an n-bit plaintext block M, and outputs an n-bit ciphertext block C. This is written as $C=E(K, M)$. The decryption function D of the block cipher is a function that takes as input, the k-bit key K and the n-bit ciphertext block C, and outputs the n-bit plaintext block M. This is written as $M=D(K, C)$. The size n of the plaintext block M and the ciphertext block C is called a block size. If the key K is fixed, the encryption function E and the decryption function D of the block cipher is an n-bit replacement function.

There are Advanced Encryption Standard (AES) described in Non-Patent Literature 2, GIFT described in Non-Patent Literature 3, and the like, as specific block ciphers. In the AES described in Non-Patent Literature 2, n is 128 and k is 128, 192, or 256. In the GIFT described in Non-Patent Literature 3, n is 64 or 128, and k is 128. Further, as represented by AES-128 described in Non-Patent Literature 2, $n=k=128$ is the most used.

A parameter of security of the authenticated encryption using the block cipher will be described.

The identification probability for the confidentiality is derived using the number of calls q of the block cipher with the encryption function Enc of the authenticated encryption and an amount of computation p of the attacker. The amount of computation p of the attacker sets that the amount of computation is 1 for one time of the block cipher. That is, the attacker has an ability to compute the block cipher p times.

The tamper probability for the integrity is derived using the amount of computation p of the attacker and a sum Q of the number of calls of the block cipher with the encryption function Enc and the number of calls of the block cipher with the decryption function Dec of the authenticated encryption.

A security level of the security of the authenticated encryption using the block cipher will be described. The security level includes an online computation security level and an offline computation security level.

The online computation security level is a minimum value between $\log_2 q'$ and $\log_2 Q'$, where $q'$ is a value of q at which the identification probability is 1 and $Q'$ is a value of Q at which the tamper probability is 1. Here, the unit of the security level of the online computation is bits.

The offline computation security level is a minimum value between $\log_2 p_1$ and $\log_2 p_2$, where $p_1$ is a value of p at which the identification probability is 1 and $p_2$ is a value of p at which the tamper probability is 1. Here, a unit of the online computation security level is a bit.

The higher the security level is, the better it is, from the perspective of long-term use of the encryption algorithm. In the case of the authenticated encryption using the block cipher, n bits are optimal for the online computation security level and n bits are optimal for the offline computation security level.

In the authenticated encryption using the block cipher, a minimum value of a required memory size is 2n bits. Here, the memory size is the size of an area required for storing a value to be updated inside the algorithm. Minimizing the memory size leads to miniaturization of the required memory (Random Access Memory (RAM)) size in a case of software, and leads to miniaturization of a hardware size in a case of hardware.

Patent Literature 1 describes an authenticated encryption algorithm using a block cipher. Further, Non-Patent Literature 4 describes an authenticated encryption algorithm Remus-N2 using a block cipher.

CITATION LIST

Patent Literature

Patent Literature 1: WO 2017/31639 A1
Non-Patent Literature 1: Tetsu Iwata, Keisuke Ohashi, and Kazuhiko Minematsu. Breaking and Repairing GCM Security Proofs. CRYPTO 2012, Proceedings. pages 31-49. Lecture Notes in Computer Science volume 7417. Springer. 2012.
Non-Patent Literature 2: National Institute of Standards and Technology (NIST). Announcing the Advanced Encryption Standard (AES). FIPS PUB 197, 2001.
Non-Patent Literature 3: Subhadeep Banik, Sumit Kumar Pandey, Thomas Peyrin, Yu Sasaki, Siang Meng Sim, and Yosuke Todo. GIFT: A Small Present—Towards Reaching the Limit of Lightweight Encryption. CHES 2017, Lecture Notes in Computer Science, volume 10529, page 321-345.
Non-Patent Literature 4: Tetsu Iwata, Mustafa Khairallah, Kazuhiko Minematsu, and Thomas Peyrin: Duel of the Titans: The Romulus and Remus Families of Lightweight AEAD Algorithms. ToSC 2020 Issue 1. p. 43-120.

SUMMARY OF INVENTION

Technical Problem

A memory size required for the authenticated encryption algorithm described in Patent Literature 1 is 2n bits, which is the minimum size. Further, the online computation security level is n bits and is optimal. However, the offline computation security level is n/2 bits and is not optimal.

The security level of the authenticated encryption algorithm described in Non-Patent Literature 4 is n bits and is optimal for both of the online computation security level and the offline computation security level.

However, a memory size is 3n bits, which is n bits more than that of the authenticated encryption algorithm described in Patent Literature 1, and is not the minimum size.

The present disclosure aims to make it possible to implement authenticated encryption using a block cipher in which both of an online computation security level and an offline computation security level are n bits and are optimal, and a memory size is 2n bits, which is the minimum size.

Solution to Problem

An encryption device according to the present disclosure includes: a division unit to sequentially divide a plaintext M into each n bits to generate a value M[1], . . . , and a value M[m];

an encryption element generation unit to set an n-bit value Ht to a value T[0] and set an n-bit value Hb to a value B[0], to generate an n-bit value B[i] by encrypting a value B[i−1] by a block cipher with a value T[i−1] as a key, for each integer i of i=1, . . . , m in ascending order, to generate a value C[i] from the value B[i] and a value M[i] generated by the division unit, and to generate an n-bit value T[i] from a value P(T[i−1]) obtained by converting the value T[i−1] using a replacement function P, a value F(B[i]) obtained by converting the value B[i] using a replacement function F, and the value C[i];

a ciphertext generation unit to generate a ciphertext C by connecting the values C[i] for i=1, . . . , m generated by the encryption element generation unit; and an authenticator generation unit to generate from a value T[m] and a value B[m], an authenticator Tag for detecting an alteration of the ciphertext C generated by the ciphertext generation unit.

Advantageous Effects of Invention

In the present disclosure, an encryption element is generated by updating a value T and a value B using replacement function P and a replacement function F. By doing this, a memory size to be internally updated is 2n bits. As a result, it is possible to implement an authenticated encryption algorithm using a block cipher whose online computation security level and offline computation security level are both optimal at n bits, and whose memory size is 2n bits, which is the minimum size.

BRIEF DESCRIPTION OF DRAWINGS

Figure 11:
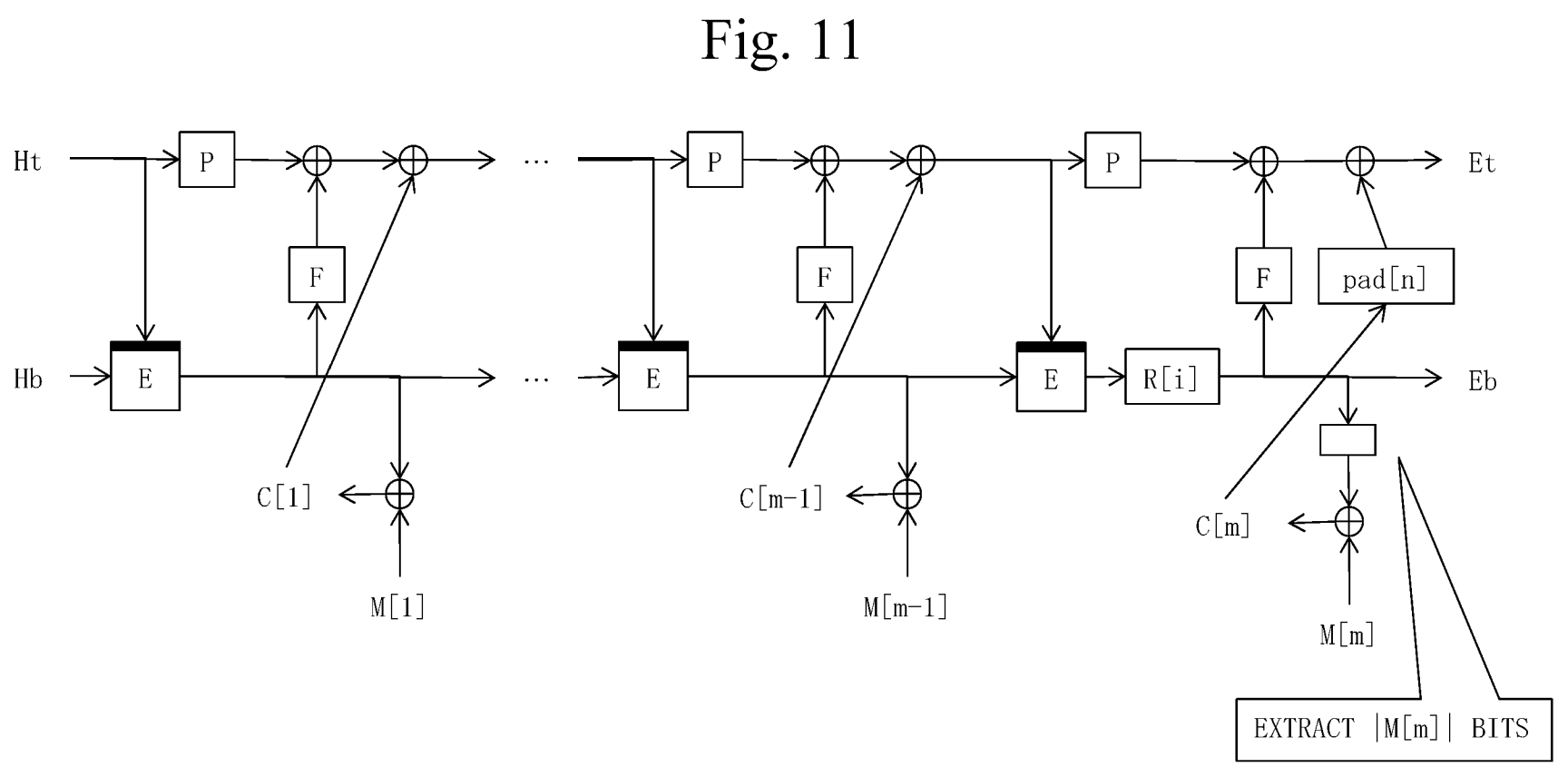

FIG. 11 is an explanatory diagram of the ciphertext generation process according to Embodiment 1.

FIG. 16 is an explanatory diagram of the plaintext generation process according to Embodiment 1.

DESCRIPTION OF EMBODIMENTS

Embodiment 1

\*\*\*Description of Configuration\*\*\*

Figure 1:
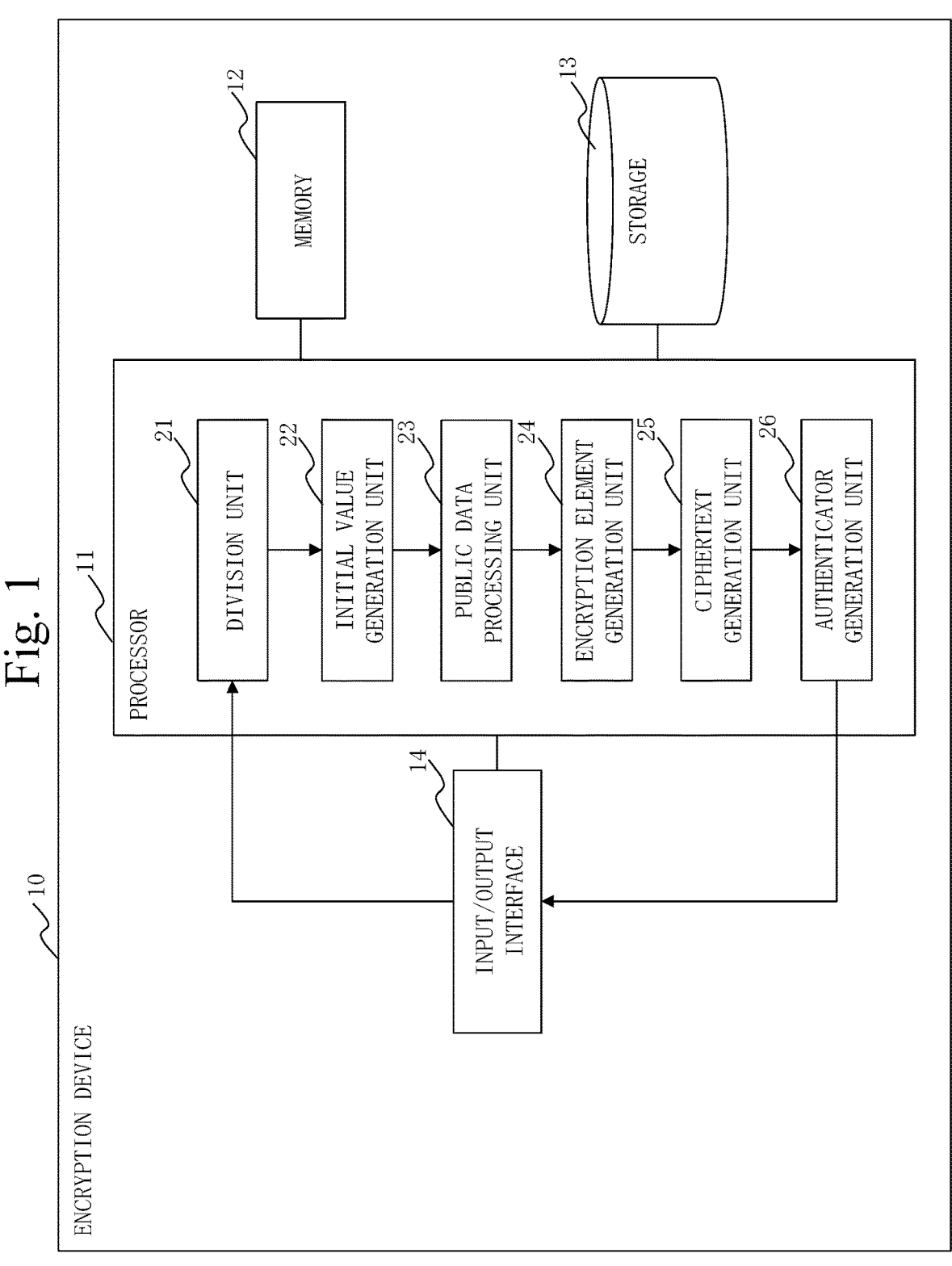
FIG. 1 is a configuration diagram of an encryption device 10 according to Embodiment 1.

A configuration of an encryption device 10 according to Embodiment 1 will be described with referring to FIG. 1.

The encryption device 10 is a computer.

The encryption device 10 includes hardware pieces of a processor 11, a memory 12, a storage 13, and an input/output interface 14. The processor 11 is connected with other hardware devices via signal lines and controls these other hardware devices.

The encryption device 10 includes, as functional components, a division unit 21, an initial value generation unit 22, a public data processing unit 23, an encryption element generation unit 24, a ciphertext generation unit 25, and an authenticator generation unit 26. Functions of the individual functional components of the encryption device 10 are implemented by software.

The storage 13 stores programs that implement the functions of the individual functional components of the encryption device 10. These programs are read into the memory 12 by the processor 11 and executed by the processor 11. This implements the functions of the individual functional components of the encryption device 10.

Figure 2:
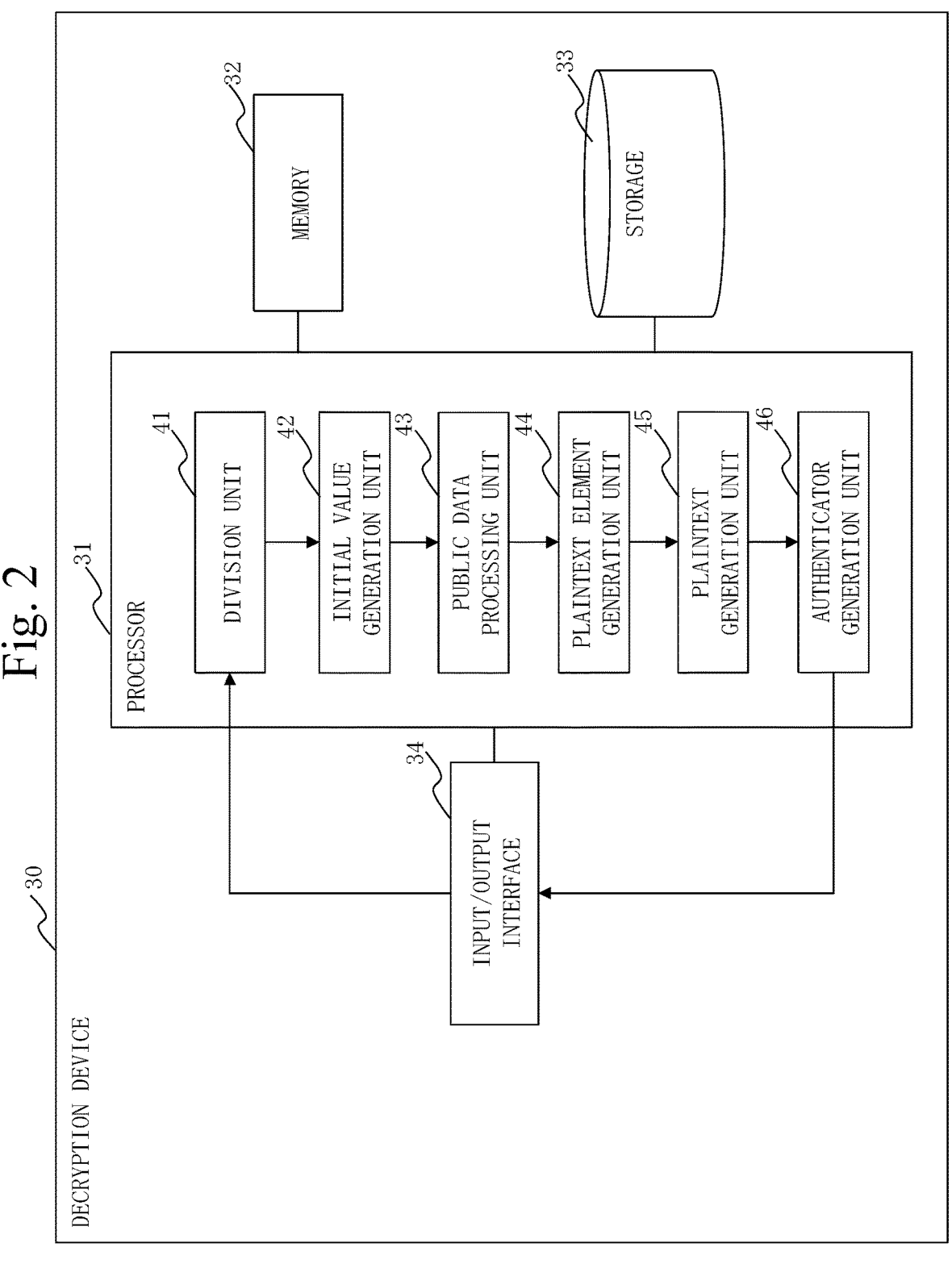
FIG. 2 is a configuration diagram of a decryption device 30 according to Embodiment 1.

A configuration of a decryption device 30 according to Embodiment 1 will be described with referring to FIG. 2.

The decryption device 30 is a computer.

The decryption device 30 includes hardware pieces of a processor 31, a memory 32, a storage 33, and an input/output interface 34. The processor 31 is connected with other hardware via signal lines and controls these other hardware devices.

The decryption device 30 includes, as functional components, a division unit 41, an initial value generation unit 42, a public data processing unit 43, a plaintext element generation unit 44, a plaintext generation unit 45, and an authenticator generation unit 46. Functions of the individual functional components of the decryption device 30 are implemented by software.

The storage 33 store programs that implement the functions of the individual functional components of the decryption device 30. These programs are read into the memory 32 by the processor 31 and executed by the processor 31. This implements the functions of the individual functional components of the decryption device 30.

Each of the processors 11 and 31 is an Integrated Circuit (IC) that performs processing. Specific examples of each of the processors 11 and 31 are a Central Processing Unit (CPU), a Digital Signal Processor (DSP), and a Graphics Processing Unit (GPU).

Each of the memories 12 and 32 is a storage device that stores data temporarily. Specific examples of each of the memories 12 and 32 are a Static Random Access Memory (SRAM), and a Dynamic Random Access Memory (DRAM).

Each of the storages 13 and 33 is a storage device that stores data. A specific example of each of the storages 13 and 33 is a Hard Disk Drive (HDD). Further, the storages 13 and 33 may be a portable recording medium such as a Secure Digital (SD, registered trademark) memory card, a CompactFlash (CF, registered trademark), a NAND flash, a flexible disk, an optical disc, a compact disc, a Blu-ray (registered trademark) disc, or a Digital Versatile Disk (DVD).

Each of the input/output interfaces 14 and 34 is an interface for communicating with external devices. Specific examples of each of the input/output interfaces 14 and 34 are an Ethernet (registered trademark) port, a Universal Serial Bus (USB) port, and a High-Definition Multimedia Interface (HDMI, registered trademark) port.

FIG. 1 illustrates only one processor as the processor 11. However, there may be a plurality of processors 11. The plurality of processors 11 may corporate with each other to execute the programs that implement the individual functions. Similarly, FIG. 2 illustrates only one processor as the processor 31. However, there may be a plurality of processors 31. The plurality of processors 31 may corporate with each other to execute the programs that implement the individual functions.

\*\*\*Description of Operation\*\*\*

Operation of the encryption device 10 and the decryption device 30 according to Embodiment 1 will be described with referring to FIGS. 3 through 18.

An operation procedure of the encryption device 10 according to Embodiment 1 is equivalent to an encryption method according to Embodiment 1. Further, a program that implements the operation of the encryption device according to Embodiment 1 is equivalent to an encryption program according to Embodiment 1.

An operation procedure of the decryption device 30 according to Embodiment 1 is equivalent to a decryption method according to Embodiment 1. Further, a program that implements the operation of the decryption device according to Embodiment 1 is equivalent to a decryption program according to Embodiment 1.

An authenticated encryption algorithm is implemented by the encryption device 10 and the decryption device 30. Here, the authenticated encryption algorithm is implemented using a block cipher in which a block size n and a key size k are equal.

The encryption device 10 implements an encryption algorithm Enc in the authenticated encryption algorithm. Further, the decryption device 30 implements a decryption algorithm Dec in the authenticated encryption algorithm.

**\*\*Description of Matters of Prerequisites\*\***

A set Nset is a set of nonces N.

An exclusive OR operator is expressed as in Formula 1.

$$\oplus \qquad \text{[Formula 1]}$$

The bit length of a bit string X is written as |X|. When the bit string X is an empty string, |X|=0.

A function pad[r] is a function that takes as input, a value which is r bits or less, and outputs an r-bit value. The function pad[r] is assumed to be injective for a value which is r−1 bits or less. As a specific example, a function pad[r](X) is a function that, for the value X which is r−1 bits or less, bit-connects 1 after X and outputs a value obtained by connecting a bit string of zeros after the bit-combined X to make its bit length to r, and that, for an r-bit value Y, outputs the value Y.

A function Init is an injective function that take as input, a value of the set Nset, and outputs an n-bit value.

It is assumed that each of const[1], const[2], const[3], and const[4] is not zero and a different n-bit value.

A result of applying a replacement function U i times to the value Y is written as U[i](Y).

Figure 3:
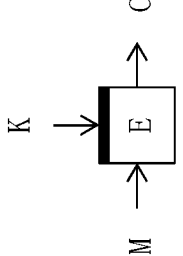
FIG. 3 is an explanatory diagram of a method of displaying an encryption function E of a block cipher according to Embodiment 1.

A method of displaying an encryption function E of the block cipher according to Embodiment 1 will be described with referring to FIG. 3.

The block cipher consists of the encryption function E and a decryption function D. The encryption function E is a function that takes as input, a k (=n)-bit key K and an n-bit plaintext block M, and outputs an n-bit ciphertext block C. This is written as C=E(K, M) and illustrated as in FIG. 3. That is, in two input values, the input value input to the blackened section is a key and the other input value is a value to be encrypted.

A basic process used in the authenticated encryption algorithm according to Embodiment 1 will be described with referring to FIG. 4.

The authenticated encryption algorithm according to Embodiment 1 uses the following basic process using a block cipher E and replacement functions P, F, and G, each of which takes as input, an n-bit value, and outputs an n-bit value. The basic process takes as input, two n-bit values X and Y, and outputs two n-bit values Z and W.

(Basic Process)

(1) The value X is encrypted by the block cipher E with the value Y as a key, and is converted using the replacement function G, so that the value Z is generated.

(2) The value W is generated by taking an exclusive OR between a value P (Y) obtained by converting the value Y using the replacement function P and a value F (Z) obtained by converting the value Z using the replacement function F.

(3) The value Z and the value W are output.

**\*\*Operation of Encryption Device 10\*\***

The operation of the encryption device 10 according to Embodiment 1 will be described with referring to FIGS. 5 through 13.

The encryption device 10 sequentially executes a division process, an initial value generation process, a public data process, a ciphertext generation process, and an authenticator generation process.

<Division Process>

The division process according to Embodiment 1 will be described with referring to FIG. 5.

(Step S101)

The division unit 21 acquires the secret key K, the nonce N, public data A, and the plaintext M.

Specifically, the division unit 21 reads the secret key K, the nonce N, and the public data A stored in the storage 13. Further, the division unit 21 acquires the plaintext M input from an input device connected via the input/output interface 14.

The secret key K is an n-bit key that is shared in advance with a transmission destination of the ciphertext C. The nonce N is an n-bit value in the set Nset. A different value is used for the nonce N for each encryption and the same value is not used unless the secret key K is changed. The public data A is a value that may be open to the public and is a value that has an arbitrary bit length. The plaintext M is a value to be encrypted and is a value that has an arbitrary bit length.

(Step S102)

The division unit 21 divides the public data A into each 2n-bit in a predetermined order, to generate a value A[1], . . . , and a value A[a]. Here, the division unit 21 divides the public data A into each 2n-bit in order from the top, to generate the value A[1], . . . , and the value A[a]. Therefore, each of the value A[1], the value A[2], . . . , and the value A[a−1] is a 2n-bit value, and the value A[a] is a 1-bit value or more and a 2n-bit value or less. Further, the public data A is a value of bit-combining the value A[1], the value A[2], . . . , and the value A[a].

The division unit 21 divides the plaintext M into each n-bit in a predetermined order, to generate a value M[1], . . . , and a value M[m]. Here, the division unit 21 divides the plaintext M into each n-bit in order from the top, to generate the value M[1], . . . , and the value M[m]. Therefore, each of the value M[1], the value M[2], . . . , and the value M[m−1] is an n-bit value, and the value M[m] is a 1-bit value or more and an n-bit value or less. Further, the plaintext M is a value of bit-combining the value M[1], the value M[2], . . . , and the value M[m].

<Initial Value Generation Process>

Figure 6:
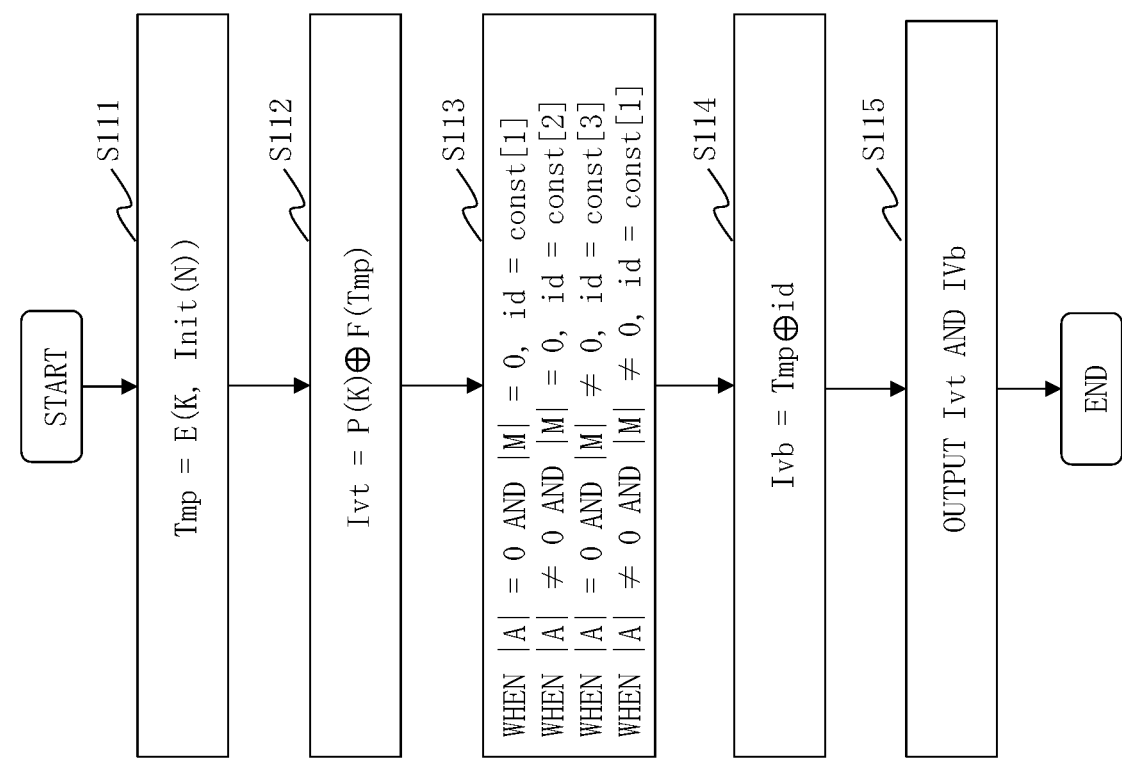
FIG. 6 is a flowchart of an initial value generation process according to Embodiment 1.
Figure 7:
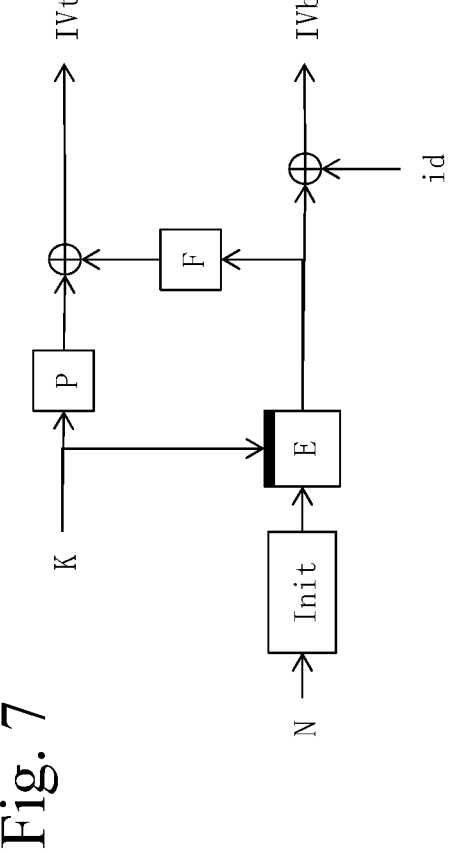
FIG. 7 is an explanatory diagram of the initial value generation process according to Embodiment 1.

The initial value generation process according to Embodiment 1 will be described with referring to FIGS. 6 and 7.

In the initial value generation process, an identity mapping, that is, G(X)=X is used as the replacement function G.

(Step S111)

The initial value generation unit 22 generates an n-bit value Init(N) by inputting the nonce N to a function Init. The initial value generation unit 22 generates a value E(N) by encrypting the value Init(N) by the block cipher E using the secret key K. The initial value generation unit 22 sets the value E(N) to a value Tmp.

(Step S112)

The initial value generation unit 22 generates a value IVt obtained from a value P(K) obtained by converting the secret key K using the replacement function P, and a value F(Tmp) (=a value F(E[N])) obtained by converting the value Tmp (=the value E(N)) using the replacement function F. Specifically, the initial value generation unit 22 generate the value IVt by computing an exclusive OR between the value P(K) and the value F(Tmp).

Here, as the replacement function P, a replacement function is used such that with respect to different values i and j, an n-bit value S, and a variable Y, Formula 2 has a unique solution for the variable Y.

$$P[i](Y) \oplus P[j](Y) = S \qquad \text{[Formula 2]}$$

As the replacement function F, a replacement function is used such that with respect to the n-bit value S and a variable Z, Formula 3 has a unique solution for Z.

$$F(Z) \oplus Z = S \qquad \text{[Formula 3]}$$

For example, the replacement function P and the replacement function F can use multiplication with a generation source on a Galois field GF($2^n$). That is, if the generation source is u, then $P(Y)=u \cdot Y$, $F(Z)=u \cdot Z$.

(Step S113)

The initial value generation unit 22 sets a value id depending on the public data A and the plaintext M.

Specifically, when the bit length of the public data A is 0 and the bit length of the plaintext M is 0, the initial value generation unit 22 sets const[1] to the value id. When the bit length of the public data A is not 0 and the bit length of the plaintext M is 0, the initial value generation unit 22 sets const[2] to the value id. When the bit length of the public data A is 0 and the bit length of the plaintext M is not 0, the initial value generation unit 22 sets const[3] to the value id. When the bit length of the public data A is not 0 and the bit length of the plaintext M is not 0, the initial value generation unit 22 sets const[4] to the value id.

(Step S114)

The initial value generation unit 22 generates a value IVb from the value Tmp(=the value E(N)) and the value id.

Specifically, the initial value generation unit 22 generate the value IVb by computing an exclusive OR between the value Tmp and the value id.

(Step S115)

The initial value generation unit 22 outputs the value IVt and the value IVb.

<Public Data Process>

Figure 8:
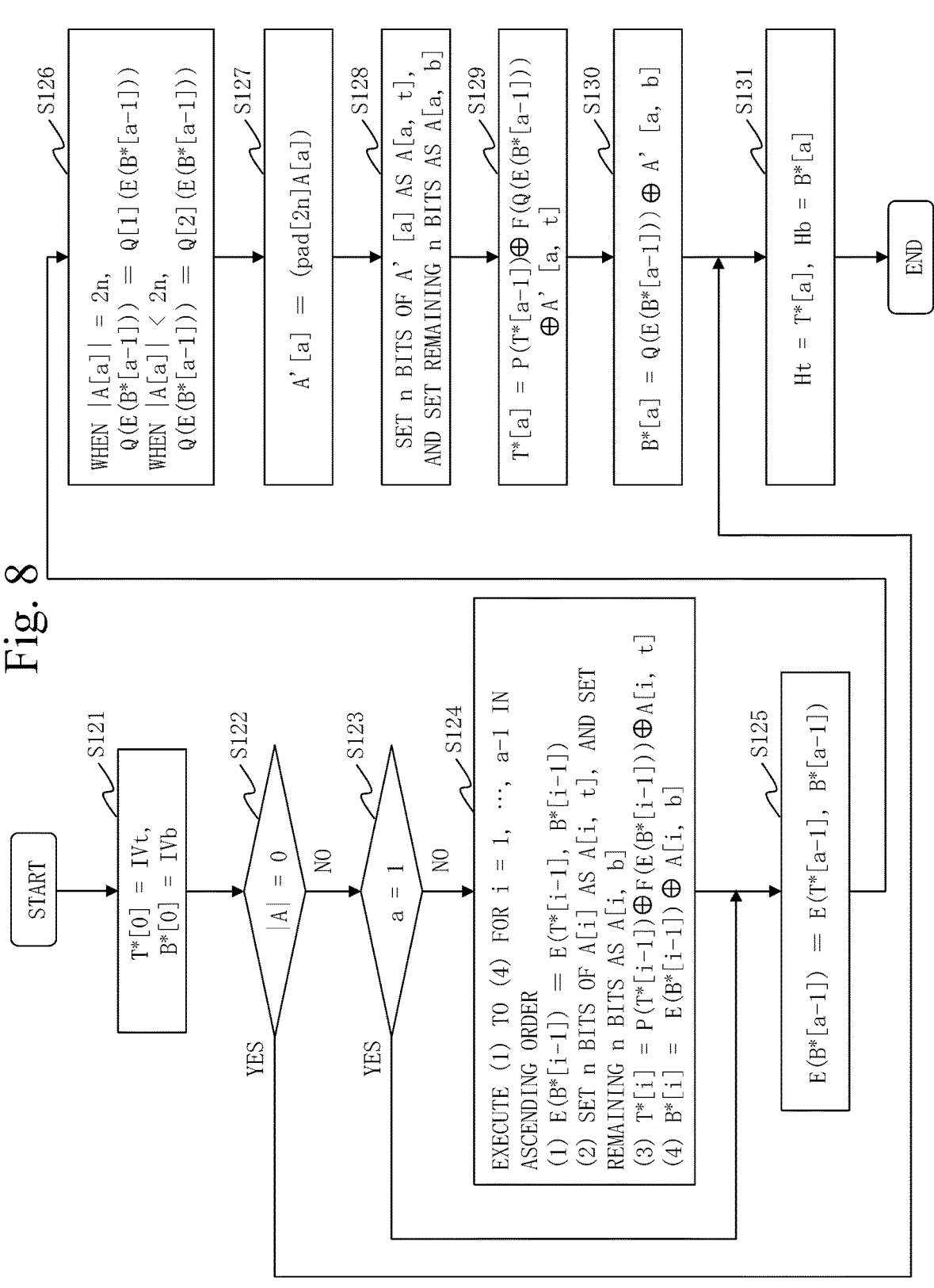
FIG. 8 is a flowchart of a public data process according to Embodiment 1.
Figure 9:
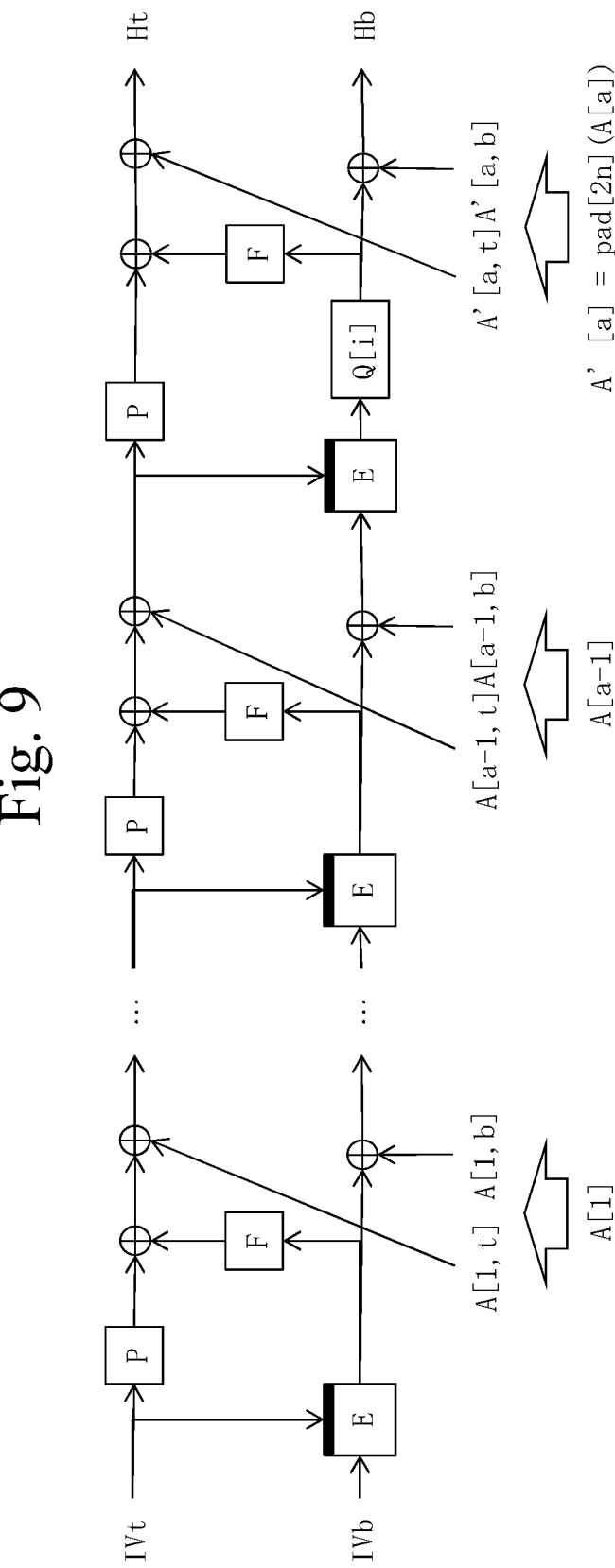
FIG. 9 is an explanatory diagram of the public data process according to Embodiment 1.

The public data process according to Embodiment 1 will be described with referring to FIGS. 8 and 9.

In the public data process, in S124, the identity mapping, that is, G(X)=X is used as the replacement function G. In step S126, a replacement function Q is used as the replacement function G.

Further, in the public data process, the same function as in the initial value generation process is used as the replacement function P. Further, as the replacement function F, a replacement function is used such that with respect to the n-bit value S and the variable Z, Formula 3 has a unique solution for Z, as with the replacement function F used in the initial value generation process.

(Step S121)

The public data processing unit 23 acquires the value IVt and the value IVb generated in the initial value generation process. The public data processing unit 23 sets the value IVt to a value T*[0] and sets the value IVb to a value B*[0].

(Step S122)

The public data processing unit 23 determines whether or not the bit length of the public data A is 0.

When the bit length of the public data A is 0, the public data processing unit 23 proceeds the process to step S131. On the other hand, when the bit length of the public data A is not 0, the public data processing unit 23 proceeds the process to step S123.

(Step S123)

Figure 5:
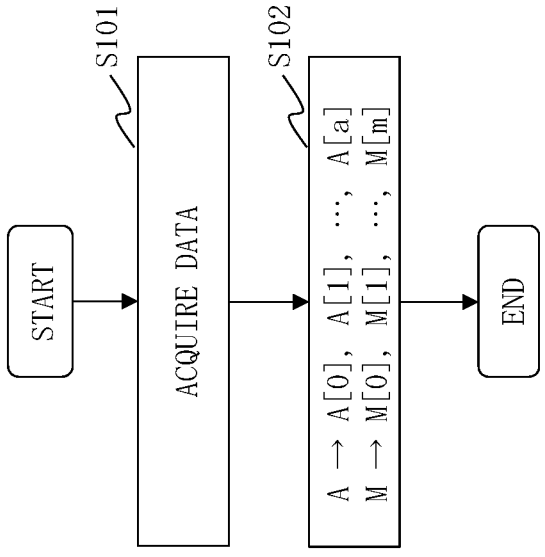
FIG. 5 is a flowchart of a division process according to Embodiment 1.

The public data processing unit 23 determines whether or not a division number a is 1, the division number a being the number of divisions of the public data A in step S102 of FIG. 5. In step S102 of FIG. 5, the public data A is divided into "a" pieces of the value A[1], . . . , and the value A[a]. The division number a indicates this "a" pieces.

When the division number a is 1, the public data processing unit 23 proceeds the process to step S125. On the other hand, when the division number a is not 1, the public data processing unit 23 proceeds the process to step S124.

(Step S124)

The public data processing unit 23 executes (1) to (4) for each integer i of i=1, . . . , a−1 in ascending order.

(1) The public data processing unit 23 generates a value E(B*[i-1]) by encrypting a value B*[i-1] by the block cipher E with a value T*[i-1] as a key.

(2) The public data processing unit 23 sets n bits at predetermined positions of a value A[i], as a value A[i, t], and sets n bits other than the value A[i, t] of the value A[i], as a value A[i, b]. For example, the public data processing unit 23 sets the first n bits of the value A[i] as the value A[i, t], and sets the remaining n bits as the value A[i, b].

(3) The public data processing unit 23 generates an n-bit value T*[i] from a value P(T*[i−1]) obtained by converting the value T*[i−1] using the replacement function P, a value F(E(B*[i−1])) obtained by converting the value E(B*[i−1]) using the replacement function F, and the value A[i, t]. Specifically, the public data processing unit 23 generate the value T*[i] by computing an exclusive OR between the value P(T*[i−1]), the value F(E(B*[i−1])), and the value A[i, t].

(4) The public data processing unit 23 generates an n-bit value B*[i] from the value E(B*[i−1]) and the value A[i, b]. Specifically, the public data processing unit 23 generates the value B*[i] by computing an exclusive OR between the value E(B*[i−1]) and the value A[i, b].

(Step S125)

The public data processing unit 23 generates a value E(B*[a−1]) by encrypting a value B*[a−1] by the block cipher E with a value T*[a−1] as a key.

(Step S126)

When the bit length of the value A[a] is 2n, the public data processing unit 23 generates as a value Q(E(B*[a−1])), a value Q[1](E(B*[a−1])) obtained by converting the value E(B*[a−1]) by applying the replacement function Q one time. On the other hand, when the bit length of the value A[a] is not 2n, the public data processing unit 23 generates as the value Q(E(B*[a−1])), a value Q[2](E(B*[a−1])) obtained by converting the value E(B*[a−1]) by applying the replacement function Q two times.

(Step S127)

The public data processing unit 23 generates a 2n-bit value A'[a] obtained by padding the value A[a] with bits using a function pad. That is, the public data processing unit 23 computes A'[a]=pad[2n](A[a]).

(Step S128)

The public data processing unit 23 sets n bits at predetermined positions of the value A'[a], as a value A'[a, t], and sets n bits other than the value A'[a, t] of the value A' [a], as a value A' [a, b]. For example, the public data processing unit 23 sets the first n bits of the value A'[a] as the value A'[a, t], and sets the remaining n bits as the value A'[a, b].

(Step S129)

The public data processing unit 23 generates a value T*[a] from a value P(T*[a−1]) obtained by converting the value T*[a−1] using the replacement function P, a value F(Q(E(B*[a−1]))) obtained by converting the value Q(E(B*[a−1])) using the replacement function F, and the value A'[a, t]. Specifically, the public data processing unit 23 generates the value T*[a] by computing an exclusive OR between the value P(T*[a−1]), the value F(Q(E(B*[a−1]))), and the value A'[a, t].

Here, as the replacement function Q, a replacement function is used such that with respect to the n-bit value S and an n-bit variable X, Formula 4 has a unique solution for X and that is not an identity mapping.

$$Q[1](X) \oplus Q[2](X)=S \qquad \text{[Formula 4]}$$

For example, the replacement function Q[1] and the replacement function Q[2] have a method of using multiplication on the Galois field GF($2^n$). That is, let u and v be two different values other than 0 and 1 on the Galois field GF($2^n$), then Q[1](Z)=u·Z, Q[2](Z)=v·Z.

(Step S130)

The public data processing unit 23 generates a value B*[a] from the value Q(E(B*[a−1])) and the value A'[a, b]. Specifically, the public data processing unit 23 generates the value B*[a] by computing an exclusive OR between the value Q(E(B*[a−1])) and the value A'[a, b].

(Step S131)

The public data processing unit 23 sets the value T*[a] to a value Ht, and sets the value B*[a] to a value Hb. Then, the public data processing unit 23 outputs the value Ht and the value Hb.

When the bit length of the public data A is 0, the value T*[0] is set to the value Ht, and the value B*[0] is set to the value Hb.

<Ciphertext Generation Process>

The ciphertext generation process according to Embodiment 1 will be described with referring to FIGS. 10 and 11.

In the ciphertext generation process, in step S144, the identity mapping, that is, G(X)=X is used as the replacement function G. In step S146, a replacement function R is used as the replacement function G.

Further, in the cyphertext generation process, the same function as in the initial value generation process is used as the replacement function P. Further, as the replacement function F, a replacement function is used such that with respect to the n-bit value S and the variable Z, Formula 3 has a unique solution for Z, as with the replacement function F use in the initial value generation process.

(Step S141)

The encryption element generation unit 24 acquires the value Ht and the value Hb generated in the public data process. The encryption element generation unit 24 sets the value Ht to a value T[0] and sets the value Hb to a value B[0].

(Step S142)

The encryption element generation unit 24 determines whether or not the bit length of the plaintext M is 0.

When the bit length of the plaintext M is 0, the encryption element generation unit 24 regards the plaintext M as an empty string and proceeds the process to step S151. On the other hand, when the bit length of the plaintext M is not 0, the encryption element generation unit 24 proceeds the process to step S143.

(Step S143)

The encryption element generation unit 24 determines whether or not a division number m is 1, the division number m being the number of divisions of the plaintext M in step S102 of FIG. 5. In step S102 of FIG. 5, the plaintext M is divided into "m" pieces of the value M[1], . . . , and the value M[m]. The division number m indicates this "m" pieces.

When the division number m is 1, the encryption element generation unit 24 proceeds the process to step S145. On the other hand, when the division number m is not 1, the encryption element generation unit 24 proceeds the process to step S144.

(Step S144)

The encryption element generation unit 24 executes (1) to (3) for each integer i of i=1, . . . , m−1 in ascending order.

(1) The encryption element generation unit 24 generates a value B[i] by encrypting a value B[i−1] by the block cipher E with a value T[i−1] as a key.

(2) The encryption element generation unit 24 generates a value C[i] from a value M[i] and the value B[i]. Specifically, the encryption element generation unit 24 generates the value C[i] by computing an exclusive OR between the value M[i] and the value B[i].

(3) The encryption element generation unit 24 generates an n-bit value T[i] from a value P(T[i−1]) obtained by converting the value T[i−1] using the replacement function P, a value F(B[i]) obtained by converting the value B[i] using the replacement function F, and the value C[i]. Specifically, the encryption element generation unit 24 generates the value T[i] by computing an exclusive OR between the value P(T[i−1]), the value F(B[i]), and the value C[i].

(Step S145)

The encryption element generation unit 24 generates a value B[m] by encrypting a value B[m−1] by the block cipher E with a value T[m−1] as a key.

(Step S146)

When the bit length of the value M[m] is n, the encryption element generation unit 24 generates as a value R(B[m]), a value R[1](B[m]) obtained by converting the value B[m] by applying the replacement function R one time. On the other hand, when the bit length of the value M[m] is not n, the encryption element generation unit 24 generates as the value R(B[m]), a value R[2](B[m]) obtained by converting the value B[m] by applying the replacement function R two times.

(Step S147)

The encryption element generation unit 24 extracts |M[m]| bits at predetermined positions of the value R(B[m]), and sets the extracted |M[m]| bits as a value B'[m]. For example, the encryption element generation unit 24 sets the first |M[m]| bits of the value R(B[m]) as the value B'[m], or sets the last |M[m]| bits of the value R(B[m]) as the value B'[m].

(Step S148)

The encryption element generation unit 24 generates a value C[m] from the value M[m] and the value B'[m]. Specifically, the encryption element generation unit 24 generates the value C[m] by computing an exclusive OR between the value M[m] and the value B'[m].

(Step S149)

The ciphertext generation unit 25 generates the ciphertext C by combining the value C[i] with respect to i=1, m. For example, the ciphertext generation unit 25 generates the ciphertext C by computing C=C[1]∥C[2]∥ . . . ∥C[m]. Here, ∥ indicates a combination.

(Step S150)

The encryption element generation unit 24 generates an n-bit value C'[m] obtained by padding the value C[m] with bits. That is, the encryption element generation unit 24 computes C'[m]=pad[n](C[m]).

Then, the encryption element generation unit 24 generates a value T[m] from a value P(T[m−1]) obtained by converting a value T[m−1] using the replacement function P, a value F(R(B[m])) obtained by converting the value R(B[m]) using the replacement function F, and the value C'[m]. Specifically, the encryption element generation unit 24 generates the value T[m] by computing an exclusive OR between the value P(T[m−1]), the value F(R(B[m])), and the value C'[m].

(Step S151)

The encryption element generation unit 24 sets the value T[m] to a value Et, and sets the value R(B[m]) to a value Eb. Then, the encryption element generation unit 24 outputs the value Et and the value Eb.

When the bit length of the plaintext M is 0, the value T[0] is set to the value Et and the value B[0] is set to the value Eb.

<Authenticator Generation Process>

The authenticator generation process according to Embodiment 1 will be described with referring to FIGS. 12 and 13.

In the authenticator generation process, the identity mapping, that is, G(X)=X is used as the replacement function G.

(Step S161)

The authenticator generation unit 26 acquires the value Et and the value Eb generated in the ciphertext generation process. The authenticator generation unit 26 sets the value Et to a value $T^+[0]$, and sets the value Eb to a value $B^+[0]$.

(Step S162)

The authenticator generation unit 26 generates a value $B^+[1]$ by encrypting the value $B^+[0]$ by the block cipher E with the value $T^+[0]$ as a key.

(Step S163)

The authenticator generation unit 26 generates an n-bit value $T^+[1]$ from a value P(1101) obtained by converting the value $T^+[0]$ using the replacement function P, and a value $F(B^+[1])$ obtained by converting the value $B^+[1]$ using the replacement function F. Specifically, the authenticator generation unit 26 generates the value $T^+[1]$ by computing an exclusive OR between the value $P(T^+[0])$ and the value $F(B^+[1])$.

(Step S164)

The authenticator generation unit 26 sets the value $T^+[1]$ to an authenticator Tag.

The authenticator generation unit 26 may set the value $B^+[1]$ to the authenticator Tag. In this case, the process of step S163 is unnecessary.

Figure 10:
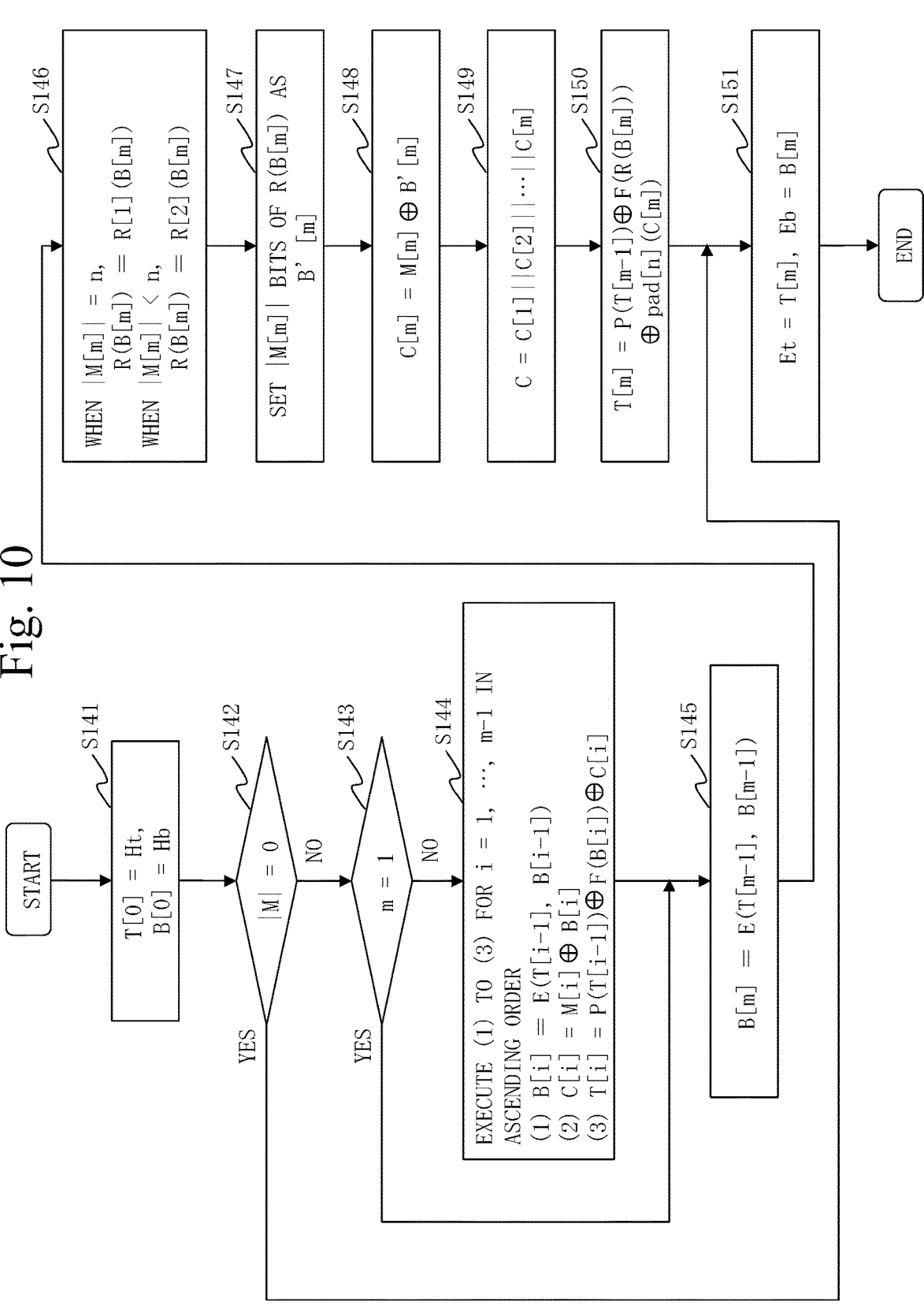
FIG. 10 is a flowchart of a ciphertext generation process according to Embodiment 1.
Figure 12:
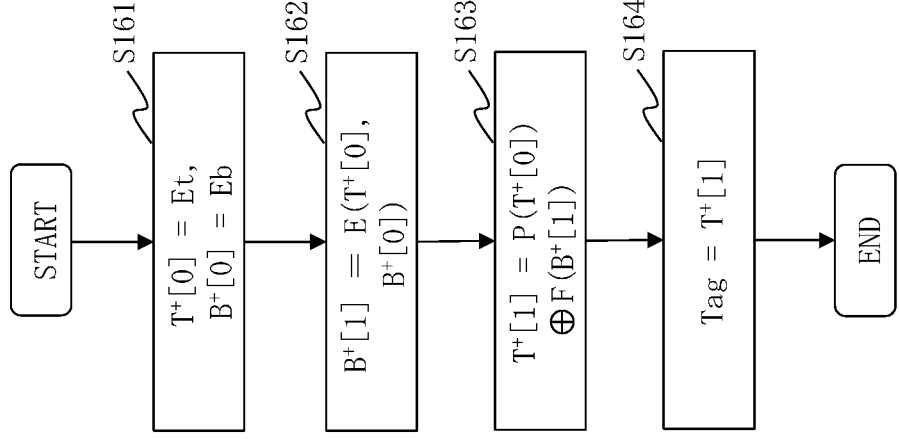
FIG. 12 is a flowchart of an authenticator generation process according to Embodiment 1.
Figure 13:
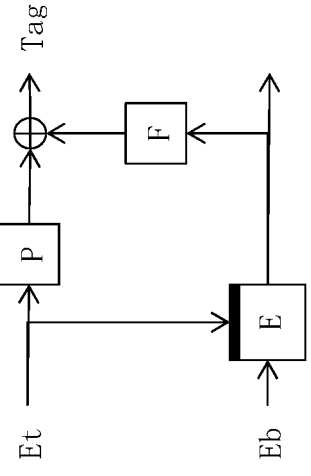
FIG. 13 is an explanatory diagram of the authenticator generation process according to Embodiment 1.

The encryption device 10 outputs the nonce N and the public data A acquired in step S101 of FIG. 5, the ciphertext C generated in step S149 of FIG. 10, and the authenticator Tag generated in step S164 of FIG. 12.

Operation of Decryption Device 30

The operation of the decryption device 30 according to Embodiment 1 will be described with referring to FIGS. 14 through 18.

The decryption device 30 sequentially executes a division process, an initial value generation process, a public data process, a plaintext generation process, and a tamper detection process.

The initial value generation process and the public data process are the same as the initial value generation process and the public data process of the encryption device 10. That is, in the initial value generation process, processing performed by the initial value generation unit 22 of the encryption device 10 is performed by the initial value generation unit 42 of the decryption device 30. In the public data process, processing performed by the public data processing unit 23 of the encryption device 10 is performed by the public data processing unit 43 of the decryption device 30.

However, in the initial value generation process, when setting the value id, the initial value generation unit 42 uses the ciphertext C instead of the plaintext M. That is, the initial value generation unit 42 sets the value id depending on the bit length of the public data A and the bit length of the ciphertext C.

<Division Process>

The division process according to Embodiment 1 will be described with referring to FIG. 14.

(Step S201)

The division unit 41 acquires the secret key K, the nonce N, the public data A, the ciphertext C, and the authenticator Tag.

Specifically, the division unit 41 reads the secret key K stored in the storage 33. Further, the division unit 21 acquires from an input device connected via the input/output interface 14, the nonce N, the public data A, the ciphertext C, and the authenticator Tag output by the encryption device 10.

(Step S202)

As with step S102 of FIG. 5, the division unit 41 divides the public data A into each 2n-bit in a predetermined order, to generate a value A[1], . . . , and a value A[a].

The division unit 41 divides the ciphertext C into each n-bit in a predetermined order, to generate a value C[1], . . . , and a value C[c]. Here, the division unit 41 divides the ciphertext C into each n-bit in order from the top, to generate the value C[1], . . . , and the value C[c]. Therefore, each of the value C[1], the value C[2], . . . , and the value C[c−1] is an n-bit value, and the value C[c] is a 1-bit value or more and an n-bit value or less. Further, the ciphertext C is a value obtained by bit-combining the value C[1], the value C[2], . . . , and the value C[c].

<Plaintext Generation Process>

Figure 15:
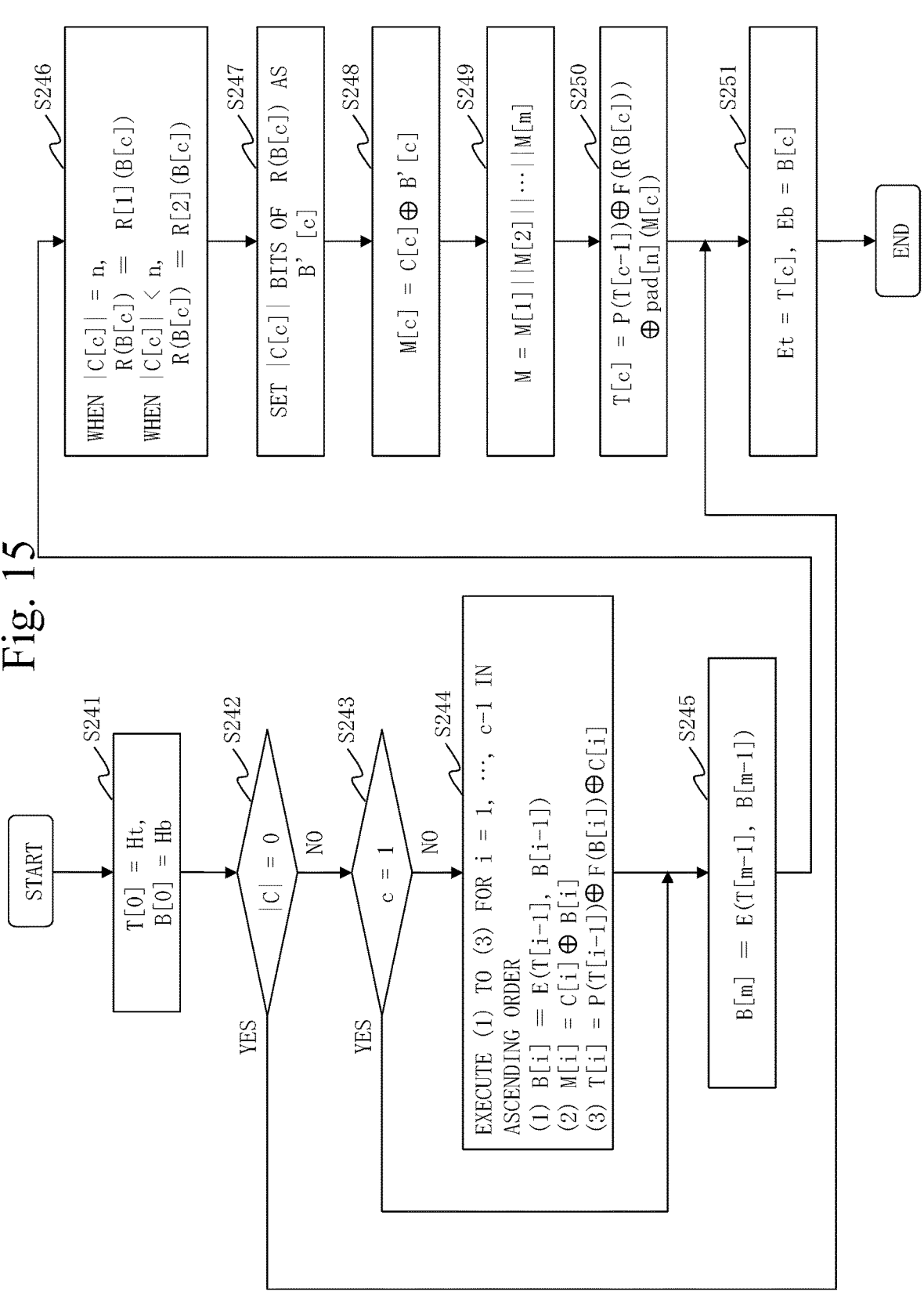
FIG. 15 is a flowchart of a plaintext generation process according to Embodiment 1.
Figure 16:
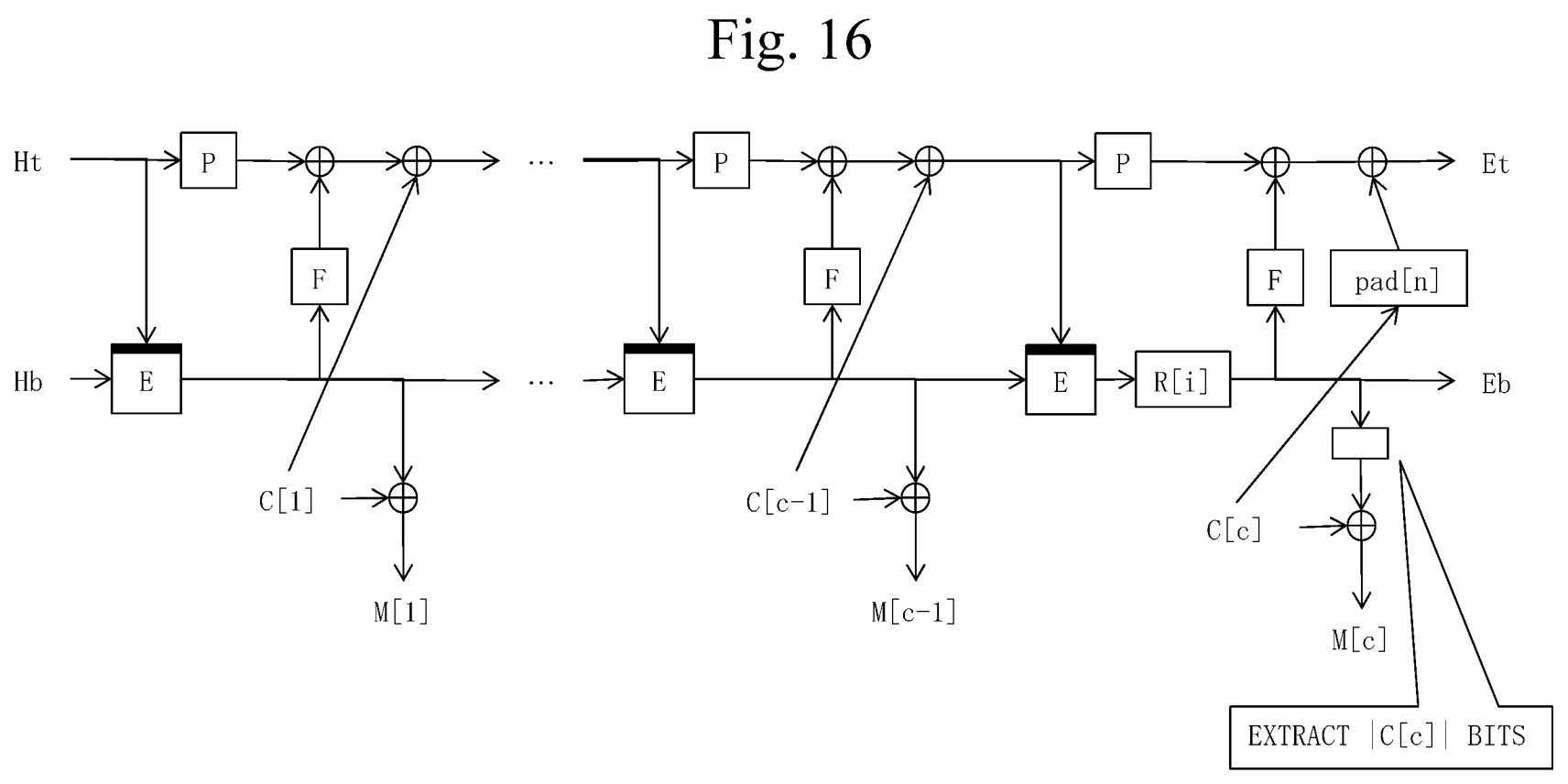

The plaintext generation process according to the Embodiment 1 will be described with referring to FIGS. 15 and 16.

In the ciphertext generation process, the same functions as in the ciphertext generation process are used for a replacement function P, a replacement function F, and a replacement function R.

(Step S241)

The plaintext element generation unit 44 acquires the value Ht and the value Hb generated in the public data process. The plaintext element generation unit 44 sets the value Ht to a value T[0], and sets the value Hb to a value B[0].

(Step S242)

The plaintext element generation unit 44 determines whether or not the bit length of the ciphertext C is 0.

When the bit length of the ciphertext C is 0, the plaintext element generation unit 44 regards the ciphertext C as an empty string and proceeds the process to step S251. On the other hand, when the bit length of the ciphertext C is not 0, the plaintext element generation unit 44 proceeds the process to step S243.

(Step S243)

Figure 14:
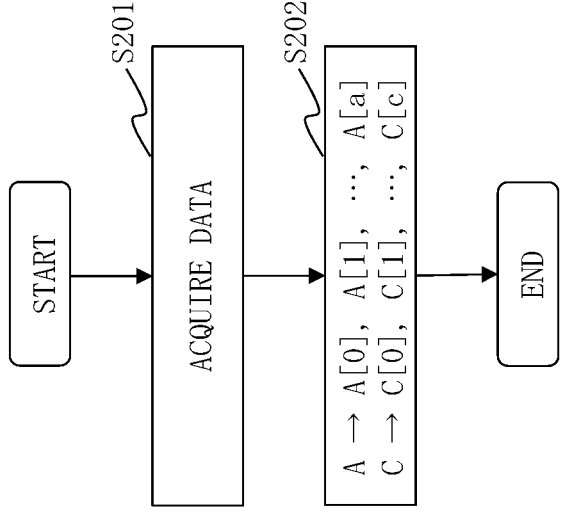
FIG. 14 is a flowchart of a division process according to Embodiment 1.

The plaintext element generation unit 44 determines whether or not a division number c is 1, the division number c being the number of divisions of the cyphertext C in step S202 of FIG. 14. In step S202 of FIG. 14, the ciphertext C is divided into "c" pieces of the value C[1], . . . , and the value C[c]. The division number c indicates this "c" pieces.

When the division number c is 1, the plaintext element generation unit 44 proceeds the process to step S245. On the other hand, when the division number c is not 1, the plaintext element generation unit 44 proceeds the process to step S244.

(Step S244)

The plaintext element generation unit 44 executes (1) to (3) for each integer i of i=1, . . . , c−1 in ascending order.

(1) The plaintext element generation unit 44 generates a value B[i] by encrypting a value B[i−1] by the block cipher E with a value T[i−1] as a key.

(2) The plaintext element generation unit 44 generates a value M[i] from a value C[i] and the value B[i]. Specifically, the plaintext element generation unit 44 generates the value M[i] by computing an exclusive OR between the value C[i] and the value B[i].

(3) The plaintext element generation unit 44 generates an n-bit value T[i] from a value P(T[i−1]) obtained by converting the value T[i−1] using the replacement function P, a value F(B[i]) obtained by converting the value B[i] using the replacement function F, and the value M[i]. Specifically, the plaintext element generation unit 44 generates the value T[i] by computing an exclusive OR between the value P(T[i−1]), the value F(B[i]), and the value M[i].

(Step S245)

The plaintext element generation unit 44 generates a value B[c] by encrypting a value B[c−1] by the block cipher E with a value T[c−1] as a key.

(Step S246)

When the bit length of the value C[c] is n, the plaintext element generation unit 44 generates as a value R(B[c]), a value R[1](B[c]) obtained by converting the value B[c] by applying the replacement function R one time. On the other hand, when the bit length of the value C[c] is not n, the plaintext element generation unit 44 generates as the value R(B[c]), a value R[2](B[c]) obtained by converting the value B[c] by applying the replacement function R two times.

(Step S247)

The plaintext element generation unit 44 extracts |C[c]| bits at predetermined positions of the value R(B[c]), and sets the extracted value |C[c]| bits as a value B'[c]. For example, the plaintext element generation unit 44 sets the first |C[c]| bits of the value R(B[c]) as the value B'[c], or sets the last |C[c]| bits of the value R(B[c]) as the value B'[c].

(Step S248)

The plaintext element generation unit 44 generates a value M[c] from the value C[c] and the value B'[c]. Specifically, the plaintext element generation unit 44 generates the value M[c] by computing an exclusive OR between the value C[c] and the value B'[c].

(Step S249)

The plaintext generation unit 45 generates the plaintext M. by combining the value M[i] with respect to i=1, . . . , c. For example, the plaintext generation unit 45 generates the plaintext M by computing M=M[1]‖M[2]‖ . . . ‖M[c]. Here, ‖ indicates a combination.

(Step S250)

The plaintext element generation unit 44 generates an n-bit value C'[c] obtained by padding the value C[c] with bits. That is, the plaintext element generation unit 44 computes C'[c]=pad[n](C[c]).

Then, the plaintext element generation unit 44 generates a value T[c] from a value P(T[c−1]) obtained by converting a value T[c−1] using the replacement function P, a value F(R(B[c])) obtained by converting the value R(B[c]) using the replacement function F, and the value C'[c]. Specifically, the plaintext element generation unit 44 generates the value T[c] by computing an exclusive OR between the value P(T[c−1]), the value F(R(B[c])), and the value C'[c].

(Step S251)

The plaintext element generation unit 44 sets the value T[c] to a value Et, and sets the value R(B[c]) to a value Eb. Then, the plaintext element generation unit 44 outputs the value Et and the value Eb.

When the bit length of the ciphertext C is 0, the value T[0] is set to the value Et and the value B[0] is set to the value Eb.

<Tamper Detection Process>

Figure 17:
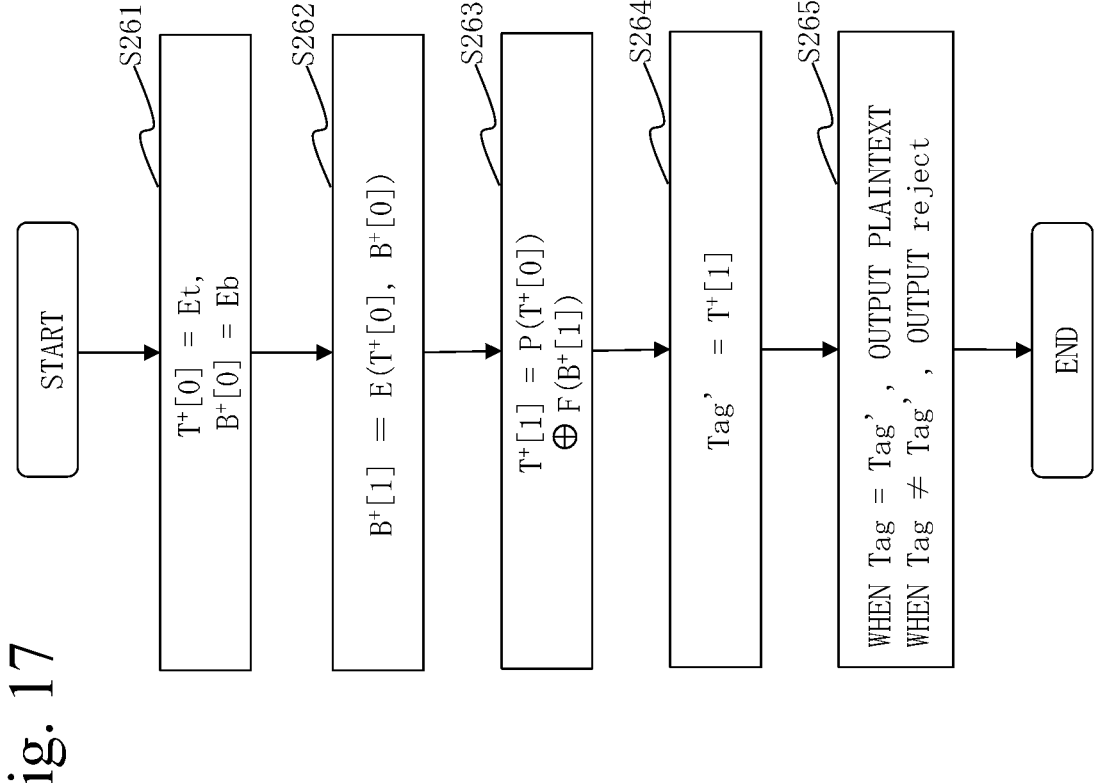
FIG. 17 is a flowchart of a tamper detection process according to Embodiment 1.
Figure 18:
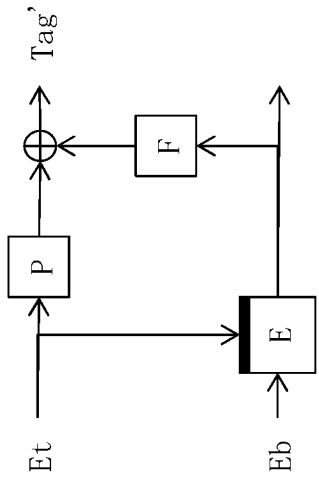
FIG. 18 is an explanatory diagram of the tamper detection process according to Embodiment 1.

The tamper detection process according to Embodiment 1 will be described with referring to FIGS. 17 and 18.

The processes from step S261 to step S264 are the same as the processes from step S161 to step S164 of FIG. 12. That is, the authenticator generation unit 46 generates the authenticator Tag by performing the same processes as the processes from step S161 to step S164 of FIG. 12. The authenticator Tag generated hare is written as an authenticator Tag'.

(Step S265)

When the authenticator Tag acquired in step S201 of FIG. 14 and the authenticator Tag' generated in step S264 are consistent with each other, the authenticator generation unit 46 outputs the plaintext M generated in the plaintext generation process. On the other hand, when the authenticator Tag acquired in step S201 of FIG. 14 and the authenticator Tag' generated in step S264 are not consistent with each other, the authenticator generation unit 46 outputs "reject".

\*\*\*Effect of Embodiment 1\*\*\*

As described above, the encryption device 10 and the decryption device according to Embodiment 1 implement an authenticated encryption algorithm. In this authenticated encryption algorithm, a memory size to be internally updated is 2n bits. As a result, this authenticated encryption algorithm is an authenticated encryption algorithm using a block cipher whose online computation security level and offline computation security level are both optimal at n bits, and whose memory size is 2n bits, which is the minimum size.

In order to optimize the online computation security level, the memory size to be updated within the authenticated encryption algorithm requires 2n bits or more, according to birthday paradox. In the authenticated encryption algorithm described in Patent Literature 1, since the memory size to be internally updated is n bits, the online computation security level is n/2 bits. In the authenticated encryption algorithm in Non-Patent Literature 3, since the memory size to be internally updated is 3n bits, the online computation security level is n bits. However, Non-Patent Literature 3 requires 3n bits for the memory size and this is not the minimum size.

With refereeing to FIG. 4, it will be described that the memory size to be internally updated is 2n bits in the authenticated encryption algorithm implemented by the encryption device 10 and the decryption device 30 according to Embodiment 1.

Figure 4:
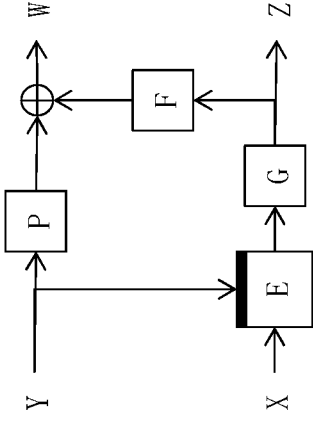
FIG. 4 is an explanatory diagram of a basic process used in an authenticated encryption algorithm according to Embodiment 1.

At start of the process illustrated in FIG. 4, it is assumed that a memory that stores the value Y is a memory 1, and a memory that stores the value X is a memory 2.

First, U=E(Y, X) is computed. Then, the memory 1 stores the value U, and the memory 2 stores the updated value Y. Here, the memory size within the encryption function E is 2n bits, and a condition is assumed to be established that the original value Y can be restored by rewinding the value in the memory 2. This condition is a condition that is met by almost all currently proposed block cipher algorithms, such as AES.

Next, the original value Y is restored from the value in memory 2. Then, the memory 1 stores the value U and the memory 2 stores the original value Y. Next, a value P(Y) is computed by converting the value Y using the replacement function P, and a value F(G(U)) is computed by converting the value U using the replacement function G and the replacement function F. Then, the memory 1 stores the value F(G(U)) and the memory 2 stores the value P(Y). Next, an exclusive OR between the value P(Y) and the value F(G(U)) is computed, and the value W is obtained. Then, the memory 1 stores the value W and the memory 2 stores the value P(Y). Finally, inverse of the replacement function F is computed from the value F(G(U)), and the value Z=G(U) is restored. Then, the memory 1 stores the value W and the memory 2 stores the value Z.

As described above, the process in FIG. 4 can be computed using a memory whose size is 2n bits. In Embodiment 1, the authenticated encryption algorithm is implemented by repeatedly executing the process in FIG. 4. Therefore, the authenticated encryption algorithm can be computed using the memory whose size is 2n bits.

\*\*\*Other Configurations\*\*\*

<Modification 1>

In Embodiment 1, the individual functional components are implemented by software. However, Modification 1 may be possible in which the individual functional components are implemented by hardware. Points in Modification 1 which differ from Embodiment 1 will be described.

Figure 19:
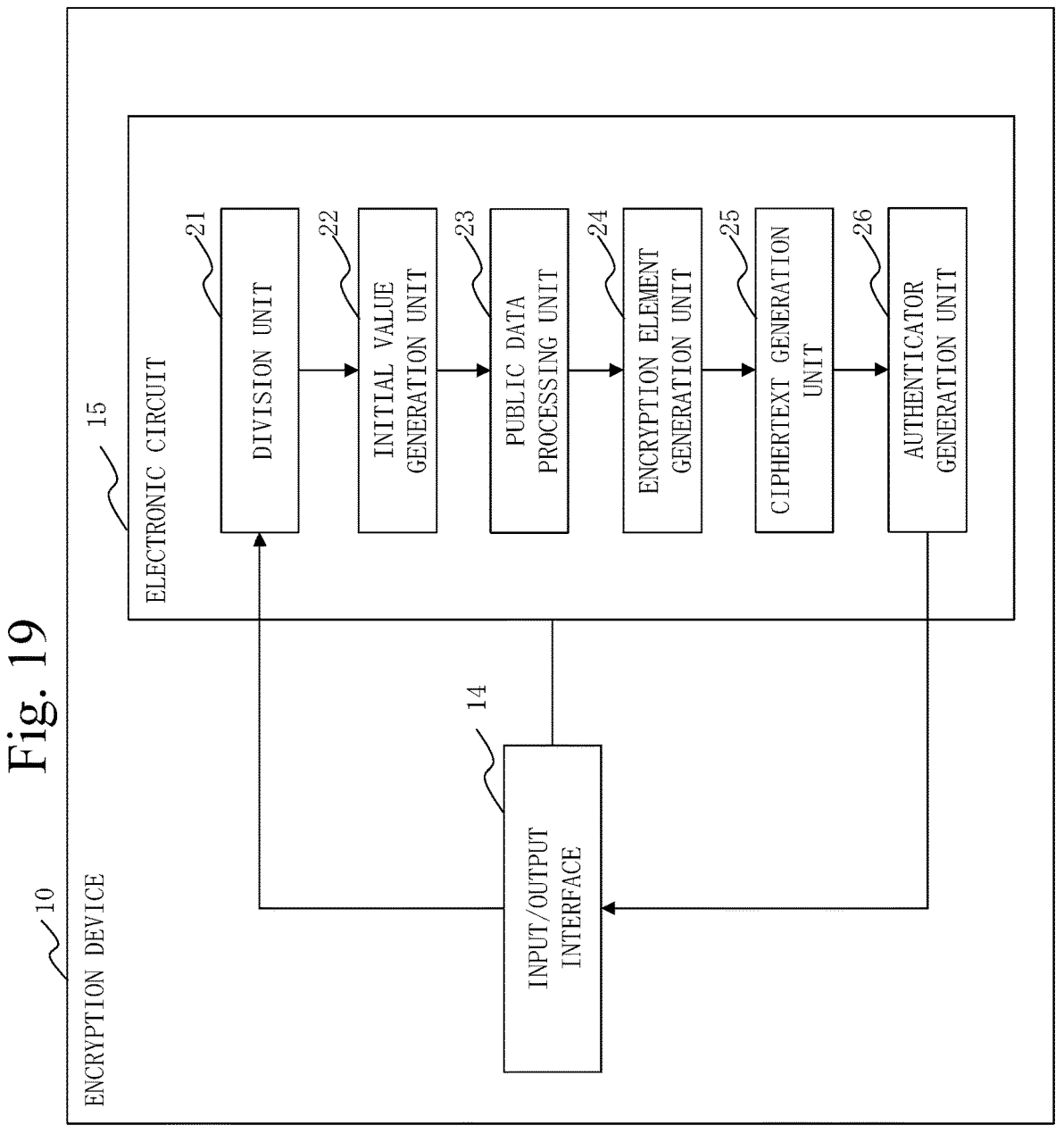
FIG. 19 is a configuration diagram of the encryption device 10 according to Modification 1.

A configuration of the encryption device 10 according to Modification 1 will be described with refereeing to FIG. 19.

When the individual functional components are implemented by hardware, the encryption device 10 includes an electronic circuit 15 in place of the processor 11, the memory 12, and the storage 13. The electronic circuit 15 is a dedicated circuit that implements the functions of the individual functional components, a function of the memory 12, and a function of the storage 13.

Figure 20:
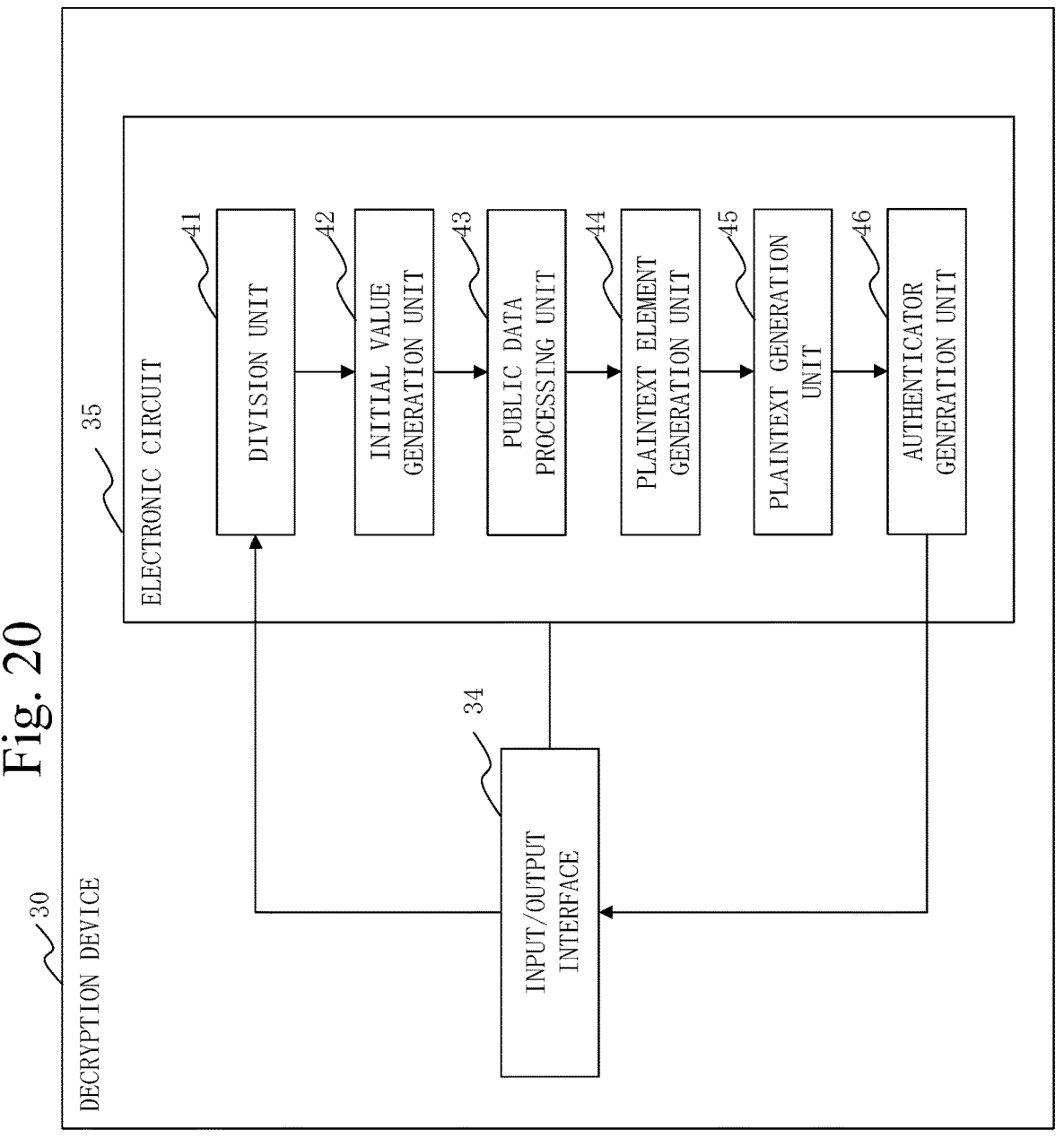
FIG. 20 is a configuration diagram of the decryption device 30 according to Modification 1.

A configuration of the decryption device 30 according to Modification 1 will be described with refereeing to FIG. 20.

When the individual functional components are implemented by hardware, the decryption device 30 includes an electronic circuit 35 in place of the processor 31, the memory 32, and the storage 33. The electronic circuit 35 is a dedicated circuit that implements the functions of the individual functional components, a function of the memory 32, and a function of the storage 33.

Each of the electronic circuits 15 and 35 is assumed to be a single circuit, a composite circuit, a programed processor, a parallel-programmed processor, a logic IC, a Gate Array (GA), an Application Specific Integrated Circuit (ASIC), or a Field-Programmable Gate Array (FPGA).

The individual functional components may be implemented by one electronic circuit 15 or 35. The individual functional components may be decentralized into a plurality of electronic circuits 15 or 35 and implemented by the plurality of electronic circuits 15 or 35.

Figure 21:
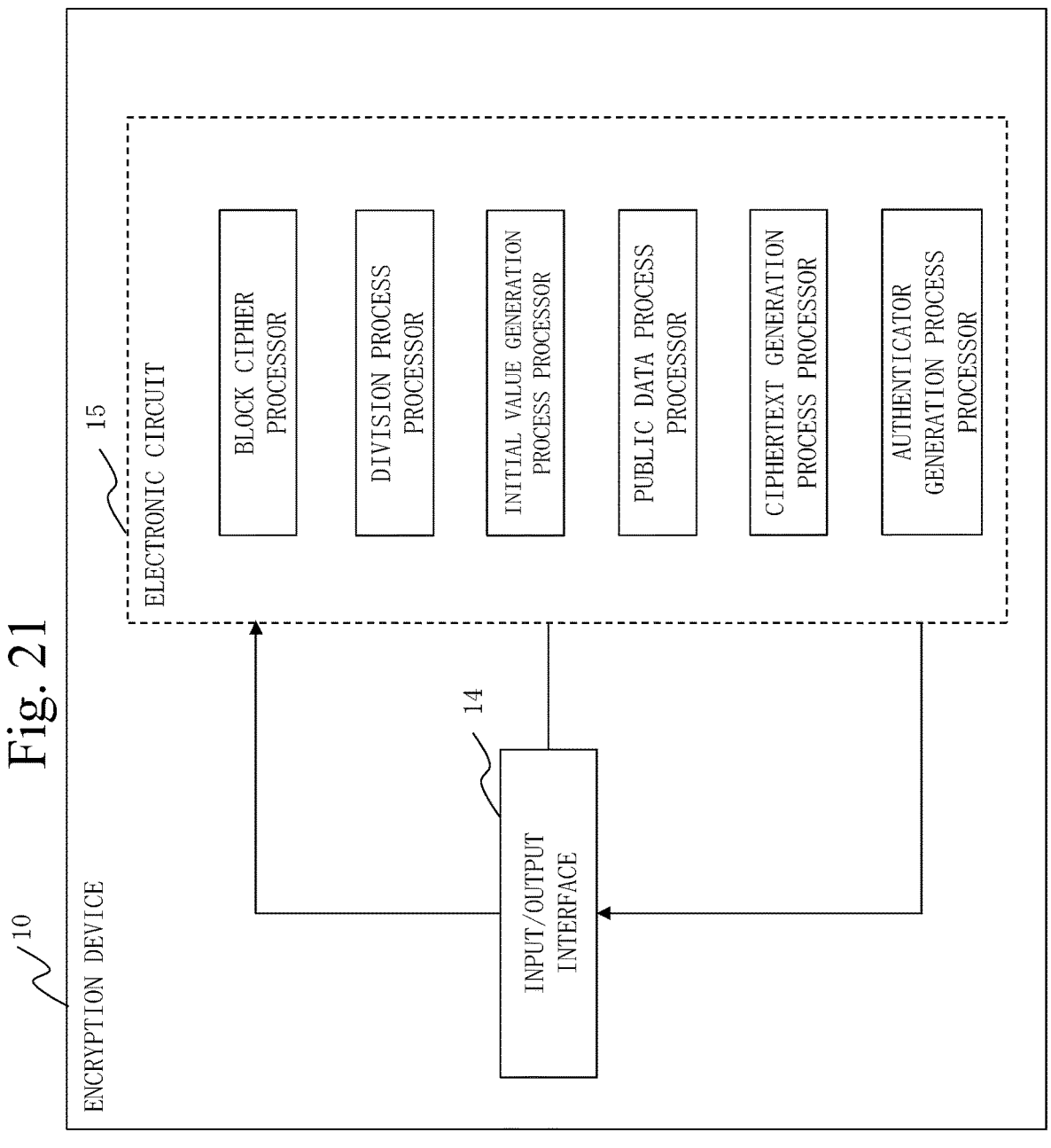
FIG. 21 is another configuration diagram of the encryption device 10 according to Modification 1.
Figure 22:
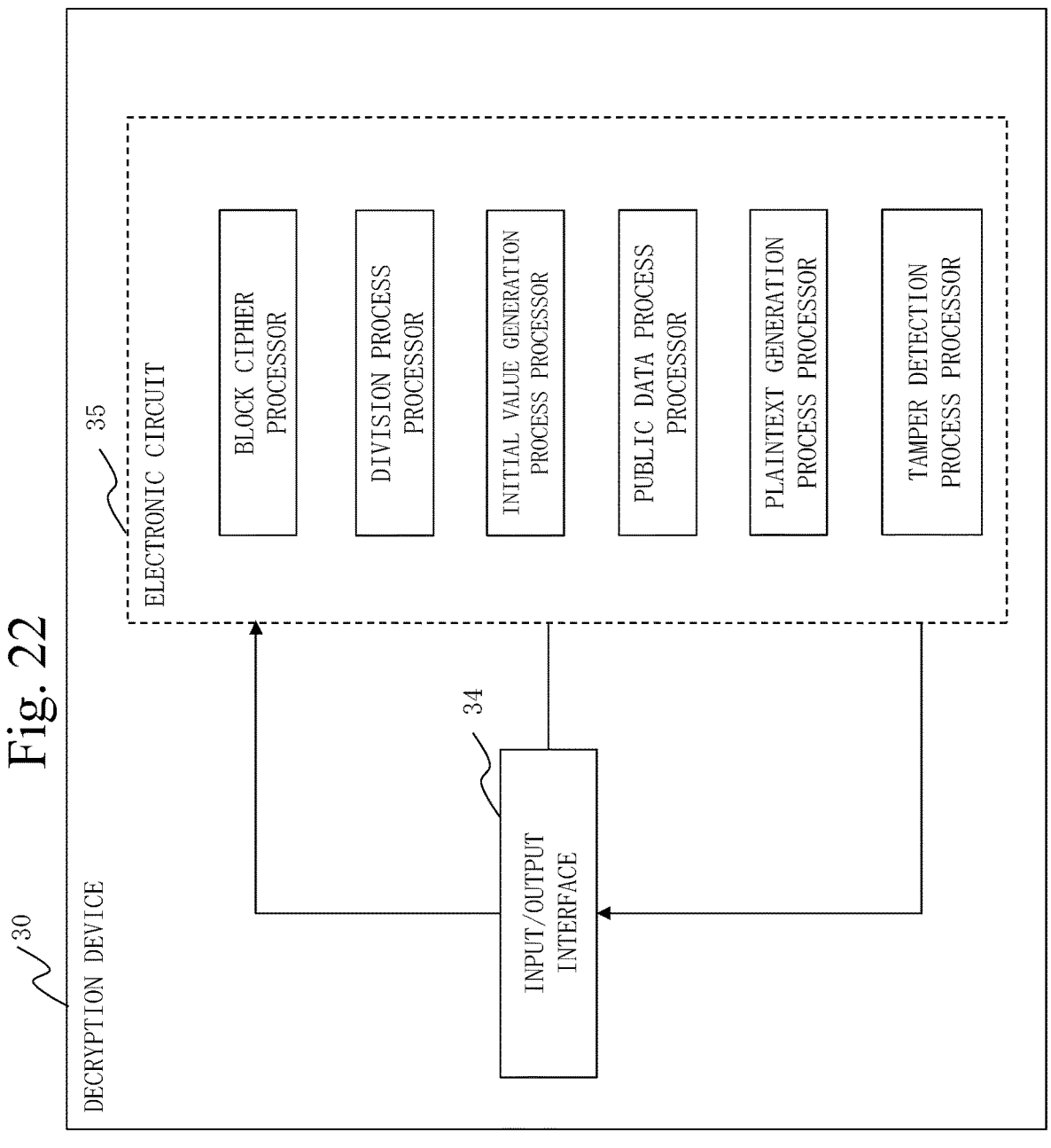
FIG. 22 is another configuration diagram of the decryption device 30 according to Modification 1.

For example, as illustrated in FIG. 21, it is considered that the encryption device 10 is configured with a block cipher processor that computes the block cipher E, a division process processor that performs the division process, an initial value generation process processor that performs the initial value generation process, a public data process processor that performs the public data process, a ciphertext generation process processor that performs the ciphertext generation process, and an authenticator generation process processor that performs the authenticator generation process, as the electronic circuit 15. Similarly, as illustrated in FIG. 22, it is considered that the decryption device 30 is configured with a block cipher processor that computes the block cipher E, a division process processor that performs the division process, an initial value generation process processor that performs the initial value generation process, a public data process processor that performs the public data process, a plaintext generation process processor that performs the plaintext generation process, and a tamper detection process processor that performs the tamper detection process, as the electronic circuit 35.

<Modification 2>

Modification 2 may be possible in which some of the individual functional components are implemented by hardware and the remaining individual functional components are implemented by software.

The processors 11 and 31, the memories 12 and 32, the storages 13 and 33, and the electronic circuits 15 and 35 are referred to as processing circuitry. That is, the functions of the individual functional components are implemented by the processing circuitry.

Further, "unit" in the above description may be read as "circuit", "step", "procedure", "process", or "processing circuitry".

The embodiments and modifications of the present disclosure have been described above. Two or more of these embodiments and modifications may be implemented in combination. Alternatively, one or more of them may be partially implemented. The present disclosure is not limited to the above embodiments and modifications, and various modifications can be made as needed.

REFERENCE SIGNS LIST

10: encryption device; 11: processor; 12: memory; 13: storage; 14: input/output interface; 15: electronic circuit; 21: division unit; 22: initial value generation unit; 23: public data processing unit; 24: encryption element generation unit; 25: ciphertext generation unit; 26: authenticator generation unit; 30: decryption device; 31: processor; 32: memory; 33: storage; 34: input/output interface; 35: electronic circuit; 41: division unit; 42: initial value generation unit; 43: public data processing unit; 44: plaintext element generation unit; 45: plaintext generation unit; 46: authenticator generation unit

The invention claimed is:

1. An encryption device comprising:

processing circuitry:

to sequentially divide a plaintext M into each n bits to generate a value M[1], . . . , and a value M[m], wherein m is an integer >=1;

to set an n-bit value Ht to a value T[0] and set an n-bit value Hb to a value B[0], to generate an n-bit value B[i] by encrypting a value B[i−1] by a block cipher with a value T[i−1] as a key, for each integer i of i=1, . . . , m in ascending order, to generate a value C[i] from the value B[i] and a generated value M[i], and to generate an n-bit value T[i] from a value P (T[i−1]) obtained by converting the value T[i−1] using a replacement function P, a value F (B[i]) obtained by converting the value B[i] using a replacement function F, and the value C[i];

to generate a ciphertext C by connecting the generated values C[i] for i=1, . . . , m; and to generate from a value T[m] and a value B[m], an authenticator Tag for detecting an alteration of the generated ciphertext C, wherein the processing circuitry maintains a total memory size of 2n bits as a sum of memory sizes for the value T and the value B, during the generation of the value T[i] using the replacement function P and the value F(B[i]) using the replacement function F.

2. The encryption device according to claim 1, wherein the processing circuitry generates the value C[i] by computing an exclusive OR between the value B[i] and the value M[i] for each integer i of i=1, . . . , m−1 in ascending order, and generates a value C[m] by computing an exclusive OR between the value M[m] and a value B'[m] obtained by extracting only a bit length

|M[m] | of the value M[m] from a value R(B[m]) obtained by converting the value B[m] using a replacement function R.

3. The encryption device according to claim 1, wherein the processing circuitry generates an n-bit value B[m+1] by encrypting the value B[m] by the block cipher with the value T[m] as a key, and generates the authenticator Tag from a value P(T[m]) obtained by converting the value T[m] using the replacement function P and a value F(B[m+1]) obtained by converting the value B[m+1] using the replacement function F.

4. The encryption device according to claim 1, wherein the processing circuitry generates an n-bit value B[m+1] by encrypting the value B[m] by the bock cipher with the value T[m] as a key, and sets the value B[m+1] to the authenticator Tag.

5. The encryption device according to claim 1, wherein the processing circuitry sequentially divides a public data A into each 2n bits to generate a value A[1], . . . , and a value A[a], wherein a is an integer >=1, and sets an n-bit value IVt as a value T*[0] and sets an n-bit value IVb as a value B*[0], generates an n-bit value B*[i] from a value E (B*[i−1]) obtained by encrypting a value B*[i−1] by the block cipher with a value T*[i−1] as a key, and an n-bit value A[i, b] of a value A[i] wherein b is an integer >=1, for each integer i of i=1, . . . , a−1 in ascending order, generates an n-bit value T*[i] from a value P(T*[i−1]) obtained by converting the value T*[i−1] using the replacement function P, a value F(E(B*[i−1])) obtained by converting the value E(B*[i−1]) using the replacement function F, and a value A[i, t] which is n bits of the value A[i] other than the value A[i, b], and generates the value Ht and the value Hb from a value T*[a−1], a value B*[a−1], and the value A[a].

6. The encryption device according to claim 5, wherein the processing circuitry generates the value Bt from a value Q(E(B*[a−1])) obtained by converting using a replacement function Q, a value E(B*[a−1]) obtained by encrypting the value B*[a−1] by the block cipher with the value T*[a−1] as a key, and an n-bit value A'[a, b] of a 2n-bit value A'[a] obtained by padding the value A[a] with bits, and generates the value Ht from a value F(Q(E(B*[a−1]))) obtained by converting the value Q(E(B*[a−1])) using the replacement function F, and an n-bit value A'[a, t] of the value A'[a] other than the value A'[a, b], wherein t is an integer >=1.

7. The encryption device according to claim 5, wherein the processing circuitry generates the value IVb from a value E(N) obtained by encrypting an n-bit nonce N by a block cipher E using an n-bit key K, and a value id depending on the public data A and the plaintext M, and generates the value IVt from a value P(K) obtained by converting the key K using the replacement function P and a value F(E[N]) obtained by converting the value E(N) using the replacement function F.

8. A decryption device comprising:

processing circuitry:

to sequentially divide a ciphertext C into each n bits to generate a value C[1], . . . , and a value C[c], wherein c is an integer >=1;

to set an n-bit value Ht to a value T[0] and set an n-bit value Hb to a value B[0], to generate an n-bit value B[i] by encrypting a value B[i−1] by a block cipher with a value T[i−1] as a key, for each integer i of i=1, . . . , c in ascending order, to generate a value M[i] from the value B[i] and a generated value C[i], and to generate an n-bit value T[i] from a value P(T[i−1]) obtained by converting the value T[i−1] using a replacement function P, a value F (B[i]) obtained by converting the value B[i] using a replacement function F, and the value C[i];

to generate a plaintext M by connecting the generated values M[i] for i=1, . . . , c; and to generate from a value T[c] and a value B[c], an authenticator Tag' for detecting an alteration of the generated plaintext M, wherein the processing circuitry maintains a total memory size of 2n bits as a sum of memory sizes for the value T and the value B, during the generation of the value T[i] using the replacement function P and the value F(B[i]) using the replacement function F.

9. The decryption device according to claim 8, wherein the processing circuitry generates the value M[i] by computing an exclusive OR between the value B[i] and the value C[i] for each integer i of i=1, . . . , c−1 in ascending order, and generates a value M[c] by computing an exclusive OR between the value C[c] and a value B'[c] obtained by extracting only a bit length |C[c]| of the value C[c] from a value R(B[c]) obtained by converting the value B[c] using a replacement function R.

10. The decryption device according to claim 8, wherein the processing circuitry generates an n-bit value B[c+1] by encrypting the value B[c] by the block cipher with the value T[c] as a key, and generates the authenticator Tag' from a value P(T[c]) obtained by converting the value T[c] using the replacement function P, and a value F(B[c+1]) obtained by converting the value B[c+1] using the replacement function F.

11. The decryption device according to claim 8, wherein the processing circuitry generates an n-bit value B[c+1] by encrypting the value B[c] by the bock cipher with the value T[c] as a key, and sets the value B[c+1] to the authenticator Tag'.

12. The decryption device according to claim 8, wherein the processing circuitry sequentially divides a public data A into each 2n bits to generate a value A[1], . . . , and a value A[a], wherein a is an integer >=1, and sets an n-bit value IVt as a value T*[0] and sets an n-bit value IVb as a value B*[0], generates an n-bit value B*[i] from a value E(B*[i−1]) obtained by encrypting a value B*[i−1] by the block cipher with a value T*[i−1] as a key, and an n-bit value A[i, b] of a value A[i] wherein b is an integer >=1, for each integer i of i=1, . . . , a−1 in ascending order, generates an n-bit value T*[i] from a value P(T*[i−1]) obtained by converting the value T*[i−1] using the replacement function P, a value F(E(B*[i−1])) obtained by converting the value E(B*[i−1]) using the replacement function F, and a value A[i, t] which is n bits of the value A[i] other than the value A[i, b], wherein t is an integer >=1, and generates the value Ht and the value Hb from a value T*[a−1], a value B*[a−1], and the value A[a].

13. The decryption device according to claim 12, wherein the processing circuitry generates the value Bt from a value Q(E (B*[a−1])) obtained by converting using a replacement function Q, a value E(B*[a−1]) obtained by encrypting the value B*[a−1] by the block cipher with the value T*[a−1] as a key, and an n-bit value A'[a, b] of a 2n-bit value A'[a] obtained by padding the value A[a] with bits, and generates the value Ht from a value F(Q(E(B*[a−1]))) obtained by converting the value Q(E(B*[a−1])) using the replacement function F, and an n-bit value A'[a, t] of the value A'[a] other than the value A'[a, b].

14. The decryption device according to claim 12, wherein the processing circuitry generates the value IVb from a value E(N) obtained by encrypting an n-bit nonce N by a block cipher E using an n-bit key K, and a value id depending on the public data A and the plaintext M, and generates the value IVt from a value P(K) obtained by converting the key K using the replacement function P and a value F(E[N]) obtained by converting the value E(N) using the replacement function F.

15. An encryption method comprising:
sequentially dividing a plaintext M into each n bits to generate a value M[1], . . . , and a value M[m], wherein m is an integer >=1;
setting an n-bit value Ht to a value T[0] and setting an n-bit value Hb to a value B[0], generating an n-bit value B[i] by encrypting a value B[i−1] by a block cipher with a value T[i−1] as a key, for each integer i of i=1, . . . , m in ascending order, generating a value C[i] from the value B[i] and a value M[i], and generating an n-bit value T[i] from a value P (T[i−1]) obtained by converting the value T[i−1] using a replacement function P, a value F(B[i]) obtained by converting the value B[i] using a replacement function F, and the value C[i];
generating a ciphertext C by connecting the values C[i] for i=1, . . . , m; and
generating from a value T[m] and a value B[m], an authenticator Tag for detecting an alteration of the ciphertext C, wherein
the encryption method further comprises maintaining a total memory size of 2n bits as a sum of memory sizes for the value T and the value B, during the generation of the value T[i] using the replacement function P and the value F(B[i]) using the replacement function F.

16. A non-transitory computer readable medium storing an encryption program for causing a computer to function as an encryption device to execute:
a division process to sequentially divide a plaintext M into each n bits to generate a value M[1], . . . , and a value M[m], wherein m is an integer >=1;
an encryption element generation process to set an n-bit value Ht to a value T[0] and set an n-bit value Hb to a value B[0], to generate an n-bit value B[i] by encrypting a value B[i−1] by a block cipher with a value T[i−1] as a key, for each integer i of i=1, . . . , m in ascending order, to generate a value C[i] from the value B[i] and a value M[i] generated by the division process, and to generate an n-bit value T[i] from a value P (T[i−1]) obtained by converting the value T[i−1] using a replacement function P, a value F(B[i]) obtained by converting the value B[i] using a replacement function F, and the value C[i];
a ciphertext generation process to generate a ciphertext C by connecting the values C[i] for i=1, . . . , m generated by the encryption element generation process; and
an authenticator generation process to generate from a value T[m] and a value B[m], an authenticator Tag for detecting an alteration of the ciphertext C generated by the ciphertext generation process, wherein
the encryption program causes the computer to further execute the encryption element generation process to maintain a total memory size of 2n bits as a sum of memory sizes for the value T and the value B, during the generation of the value T[i] using the replacement function P and the value F(B[i]) using the replacement function F.

17. A decryption method comprising:
sequentially dividing a ciphertext C into each n bits to generate a value C[1], . . . , and a value C[c], wherein c is an integer >=1;
setting an n-bit value Ht to a value T[0] and setting an n-bit value Hb to a value B[0], generating an n-bit value B[i] by encrypting a value B[i−1] by a block cipher with a value T[i−1] as a key, for each integer i of i=1, . . . , c in ascending order, generating a value M[i] from the value B[i] and a value C[i], and generating an n-bit value T[i] from a value P (T[i−1]) obtained by converting the value T[i−1] using a replacement function P, a value F (B[i]) obtained by converting the value B[i] using a replacement function F, and the value C[i];
generating a plaintext M by connecting the values M[i] for i=1, . . . , c; and
generating from a value T[c] and a value B[c], an authenticator Tag' for detecting an alteration of the plaintext M, wherein
the decryption method further comprises maintaining a total memory size of 2n bits as a sum of memory sizes for the value T and the value B, during the generation of the value T[i] using the replacement function P and the value F (B[i]) using the replacement function F.

18. A non-transitory computer readable medium storing a decryption program for causing a computer to function as a decryption device to execute:
a division process to sequentially divide a ciphertext C into each n bits to generate a value C[1], . . . , and a value C[c], wherein c is an integer >=1;
a plaintext element generation process to set an n-bit value Ht to a value T[0] and set an n-bit value Hb to a value B[0], to generate an n-bit value B[i] by encrypting a value B[i−1] by a block cipher with a value T[i−1] as a key, for each integer i of i=1, . . . , c in ascending order, to generate a value M[i] from the value B[i] and a value C[i] generated by the division process, and to generate an n-bit value T[i] from a value P(T[i−1]) obtained by converting the value T[i−1] using a replacement function P, a value F(B[i]) obtained by converting the value B[i] using a replacement function F, and the value C[i];
a plaintext generation process to generate a plaintext M by connecting the values M[i] for i=1, . . . , c generated by the plaintext element generation process; and
an authenticator generation process to generate from a value T[c] and a value B[c], an authenticator Tag' for detecting an alteration of the plaintext M generated by the plaintext generation process, wherein
the decryption program causes the computer to further execute the plaintext element generation process to maintain a total memory size of 2n bits as a sum of memory sizes for the value T and the value B, during the generation of the value T[i] using the replacement function P and the value F(B[i]) using the replacement function F.

* * * * *